(12) United States Patent
Flynn

(10) Patent No.: US 11,615,557 B2
(45) Date of Patent: Mar. 28, 2023

(54) POINT CLOUD COMPRESSION USING OCTREES WITH SLICING

(71) Applicant: Apple Inc., Cupertino, CA (US)

(72) Inventor: David Flynn, Munich (DE)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/355,819

(22) Filed: Jun. 23, 2021

(65) Prior Publication Data

US 2021/0407147 A1 Dec. 30, 2021

Related U.S. Application Data

(60) Provisional application No. 63/043,676, filed on Jun. 24, 2020.

(51) Int. Cl.
*G06T 9/40* (2006.01)
*G06T 15/10* (2011.01)

(52) U.S. Cl.
CPC ............... *G06T 9/40* (2013.01); *G06T 15/10* (2013.01)

(58) Field of Classification Search
CPC .................................. G06T 9/40; G06T 15/10
See application file for complete search history.

(56) References Cited

U.S. PATENT DOCUMENTS

| 5,793,371 A | 8/1998 | Deering |
|---|---|---|
| 5,842,004 A | 11/1998 | Deering |
| 5,867,167 A | 2/1999 | Deering |
| 5,870,094 A | 2/1999 | Deering |
| 5,905,502 A | 5/1999 | Deering |
| 5,933,153 A | 8/1999 | Deering |

(Continued)

FOREIGN PATENT DOCUMENTS

| CA | 309618 | 10/2019 |
|---|---|---|
| CN | 10230618 | 1/2012 |

(Continued)

OTHER PUBLICATIONS

Pragyana K. Mishra, "Image and Depth Coherent Surface Description", Doctoral dissertation, Carnegie Mellon University, The Robotics Institute, Mar. 2005, pp. 1-152.

(Continued)

*Primary Examiner* — Phi Hoang
(74) *Attorney, Agent, or Firm* — Alexander A. Knapp; Kowert, Hood, Munyon, Rankin & Goetzel, P.C.

(57) ABSTRACT

An encoder is configured to compress point cloud geometry information using an octree geometric compression technique that utilizes slices corresponding in size to data transmission units. In some embodiments, a subsequent slice may be set to use a re-set entropy context or may be set to use an entropy context saved for a preceding slice. In some embodiments, an entropy context for the preceding slice may be for a slice other than the immediately preceding slice of the subsequent slice being evaluated, such that if the immediately preceding slice is lost in transmission (or if the immediately preceding slice and the subsequent slice are being evaluated in parallel) the subsequent slice's entropy context can still be determined without depending on the immediately preceding slice. A decoder is configured to reconstruct a point cloud based on a bit stream encoded by the encoder.

20 Claims, 14 Drawing Sheets

(56) References Cited

U.S. PATENT DOCUMENTS

| | | |
|---|---|---|
| 6,018,353 A | 1/2000 | Deering |
| 6,028,610 A | 2/2000 | Deering |
| 6,088,034 A | 7/2000 | Deering |
| 6,188,796 B1 | 2/2001 | Kadono |
| 6,215,500 B1 | 4/2001 | Deering |
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 8,040,355 B2 | 10/2011 | Burley |
| 8,055,070 B2 | 11/2011 | Bassi et al. |
| 8,264,549 B2 | 9/2012 | Tokiwa et al. |
| 8,411,932 B2 | 4/2013 | Liu et al. |
| 8,520,740 B2 | 8/2013 | Flachs |
| 8,566,736 B1 | 10/2013 | Jacob |
| 8,643,515 B2 | 2/2014 | Cideciyan |
| 8,780,112 B2 | 7/2014 | Kontkanen et al. |
| 8,805,097 B2 | 8/2014 | Ahn et al. |
| 8,884,953 B2 | 11/2014 | Chen et al. |
| 9,064,311 B2 | 6/2015 | Mammou et al. |
| 9,064,331 B2 | 6/2015 | Yamashita |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,108,867 B1 | 10/2018 | Vallespi-Gonzalez |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | Karlinsky et al. |
| 10,546,415 B2 | 1/2020 | Petkov |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou et al. |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 | 3/2021 | Li |
| 10,939,129 B2 | 3/2021 | Mammou |
| 10,977,773 B2 | 4/2021 | Hemmer |
| 10,984,541 B2 | 4/2021 | Lim |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2 | 5/2021 | Oh |
| 11,044,478 B2 | 6/2021 | Tourapis et al. |
| 11,044,495 B1 | 6/2021 | Dupont |
| 11,095,908 B2 | 8/2021 | Dawar |
| 11,113,845 B2 | 9/2021 | Tourapis et al. |
| 11,122,102 B2 | 9/2021 | Oh |
| 11,122,279 B2 | 9/2021 | Joshi |
| 11,132,818 B2 | 9/2021 | Mammou et al. |
| 11,200,701 B2 | 12/2021 | Aksu |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2 | 2/2022 | Roimela |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2 | 5/2022 | Melkote |
| 11,363,309 B2 | 6/2022 | Tourapis et al. |
| 11,386,524 B2 | 7/2022 | Mammou et al. |
| 11,398,058 B2 | 7/2022 | Zakharchenko |
| 11,503,367 B2 | 11/2022 | Yea |
| 2002/0181741 A1 | 12/2002 | Masukura |
| 2004/0217956 A1 | 11/2004 | Besl et al. |
| 2006/0133508 A1 | 6/2006 | Sekiguchi |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2008/0225116 A1 | 9/2008 | Kang |
| 2009/0016598 A1 | 1/2009 | Lojewski |
| 2009/0027412 A1 | 1/2009 | Burley |
| 2009/0087111 A1 | 4/2009 | Noda et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman |
| 2010/0208807 A1 | 8/2010 | Sikora |
| 2010/0260429 A1 | 10/2010 | Ichinose |
| 2010/0260729 A1 | 10/2010 | Cavato et al. |
| 2010/0296579 A1 | 11/2010 | Panchal et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |

(56) References Cited

U.S. PATENT DOCUMENTS

| | | |
|---|---|---|
| 2013/0156101 A1 | 6/2013 | Lu |
| 2013/0195352 A1 | 8/2013 | Nystad |
| 2013/0202197 A1 | 8/2013 | Reeler |
| 2013/0321418 A1 | 12/2013 | Kirk |
| 2013/0322738 A1 | 12/2013 | Oh |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0176672 A1 | 6/2014 | Lu |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Booh |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0249401 A1 | 8/2017 | Eckart et al. |
| 2017/0323617 A1 | 11/2017 | Yang |
| 2017/0337724 A1 | 11/2017 | Gervais |
| 2017/0347100 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0018786 A1 | 1/2018 | Jakubiak |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0192061 A1* | 7/2018 | He .................. H04N 19/172 |
| 2018/0253867 A1 | 9/2018 | Laroche |
| 2018/0260416 A1 | 9/2018 | Elkaim |
| 2018/0268570 A1 | 9/2018 | Budagavi |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0045157 A1 | 2/2019 | Venshtain |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy et al. |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1 | 11/2019 | Pavlovic |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0151913 A1* | 5/2020 | Budagavi .................. G06T 17/00 |
| 2020/0153885 A1 | 5/2020 | Lee |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi et al. |
| 2020/0219288 A1 | 7/2020 | Joshi |
| 2020/0219290 A1 | 7/2020 | Tourapis et al. |
| 2020/0228836 A1 | 7/2020 | Schwarz et al. |
| 2020/0244993 A1 | 7/2020 | Schwarz et al. |
| 2020/0260063 A1 | 8/2020 | Hannuksela |
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0294271 A1* | 9/2020 | Ilola .................. G06T 9/00 |
| 2020/0302571 A1 | 9/2020 | Schwartz |
| 2020/0302578 A1 | 9/2020 | Graziosi |
| 2020/0302621 A1 | 9/2020 | Kong |
| 2020/0302651 A1 | 9/2020 | Flynn |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2020/0396489 A1 | 12/2020 | Flynn |
| 2020/0413096 A1 | 12/2020 | Zhang |
| 2021/0005006 A1 | 1/2021 | Oh |
| 2021/0006805 A1 | 1/2021 | Urban et al. |
| 2021/0006833 A1 | 1/2021 | Tourapis et al. |
| 2021/0012536 A1 | 1/2021 | Mammou et al. |
| 2021/0012538 A1 | 1/2021 | Wang |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0056732 A1* | 2/2021 | Han .................. H04L 65/70 |
| 2021/0084333 A1 | 3/2021 | Zhang |
| 2021/0090301 A1 | 3/2021 | Mammou et al. |
| 2021/0097723 A1 | 4/2021 | Kim et al. |
| 2021/0097725 A1 | 4/2021 | Mammou et al. |
| 2021/0097726 A1 | 4/2021 | Mammou et al. |
| 2021/0099701 A1 | 4/2021 | Tourapis et al. |
| 2021/0103780 A1 | 4/2021 | Mammou et al. |
| 2021/0104014 A1 | 4/2021 | Kolb, V |
| 2021/0104073 A1 | 4/2021 | Yea et al. |

(56) References Cited

U.S. PATENT DOCUMENTS

| | | | |
|---|---|---|---|
| 2021/0104075 A1 | 4/2021 | Mammou et al. | |
| 2021/0105022 A1 | 4/2021 | Flynn et al. | |
| 2021/0105493 A1 | 4/2021 | Mammou et al. | |
| 2021/0105504 A1 | 4/2021 | Hur et al. | |
| 2021/0112281 A1 | 4/2021 | Wang | |
| 2021/0118190 A1 | 4/2021 | Mammou et al. | |
| 2021/0119640 A1 | 4/2021 | Mammou et al. | |
| 2021/0142522 A1 | 5/2021 | Li | |
| 2021/0150765 A1 | 5/2021 | Mammou | |
| 2021/0150766 A1 | 5/2021 | Mammou et al. | |
| 2021/0150771 A1 | 5/2021 | Huang | |
| 2021/0166432 A1 | 6/2021 | Wang | |
| 2021/0166436 A1 | 6/2021 | Zhang | |
| 2021/0168386 A1 | 6/2021 | Zhang | |
| 2021/0183112 A1 | 6/2021 | Mammou et al. | |
| 2021/0185331 A1 | 6/2021 | Mammou et al. | |
| 2021/0195162 A1 | 6/2021 | Chupeau et al. | |
| 2021/0201541 A1 | 7/2021 | Lasserre | |
| 2021/0203989 A1 | 7/2021 | Wang | |
| 2021/0211724 A1 | 7/2021 | Kim et al. | |
| 2021/0217139 A1 | 7/2021 | Yano | |
| 2021/0217203 A1 | 7/2021 | Kim et al. | |
| 2021/0217206 A1 | 7/2021 | Flynn | |
| 2021/0218969 A1 | 7/2021 | Lasserre | |
| 2021/0218994 A1 | 7/2021 | Flynn | |
| 2021/0233281 A1 | 7/2021 | Wang et al. | |
| 2021/0248784 A1 | 8/2021 | Gao et al. | |
| 2021/0248785 A1 | 8/2021 | Zhang | |
| 2021/0256735 A1 | 8/2021 | Tourapis et al. | |
| 2021/0258610 A1 | 8/2021 | Iguchi | |
| 2021/0264640 A1 | 8/2021 | Mammou et al. | |
| 2021/0264641 A1 | 8/2021 | Iguchi | |
| 2021/0266597 A1 | 8/2021 | Kim et al. | |
| 2021/0281874 A1 | 9/2021 | Lasserre | |
| 2021/0295569 A1 | 9/2021 | Sugio | |
| 2021/0319593 A1 | 10/2021 | Flynn | |
| 2021/0383576 A1* | 12/2021 | Olivier | G06T 9/001 |
| 2021/0400280 A1 | 12/2021 | Zaghetto | |
| 2021/0407148 A1 | 12/2021 | Flynn | |
| 2022/0030258 A1 | 1/2022 | Zhang | |
| 2022/0084164 A1 | 3/2022 | Hur | |
| 2022/0101555 A1 | 3/2022 | Zhang | |
| 2022/0116659 A1 | 4/2022 | Pesonen | |
| 2022/0164994 A1 | 5/2022 | Joshi | |

FOREIGN PATENT DOCUMENTS

| | | |
|---|---|---|
| CN | 104408689 | 3/2015 |
| CN | 106651942 | 5/2017 |
| CN | 108632607 | 10/2018 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| WO | 200004506 | 1/2000 |
| WO | 2013022540 | 2/2013 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

Robert Cohen, "CE 3.2 point-based prediction for point loud compression", dated Apr. 2018, pp. 1-6.

Jang et al., Video-Based Point-Cloud-Compression Standard in MPEG: From Evidence Collection to Committee Draft [Standards in a Nutshell], IEEE Signal Processing Magazine, Apr. 2019.

Ekekrantz, Johan, et al., "Adaptive Cost Function for Pointcloud Registration," arXiv preprint arXiv: 1704.07910 (2017), pp. 1-10.

Vincente Morell, et al., "Geometric 3D point cloud compression", Copyright 2014 Elsevier B.V. All rights reserved, pp. 1-18.

U.S. Appl. No. 17/523,826, filed Nov. 10, 2021, Mammou, et a.

Chou, et al., "Dynamic Polygon Clouds: Representation and Compression for VR/AR", ARXIV ID: 1610.00402, Published Oct. 3, 2016, pp. 1-28.

U.S. Appl. No. 17/804,477, filed May 27, 2022, Khaled Mammou, et al.

Jingming Dong, "Optimal Visual Representation Engineering and Learning for Computer Vision", Doctoral Dissertation, UCLA, 2017, pp. 1-151.

Khaled Mammou et al, "Working Draft of Point Cloud Coding for Category 2 (Draft 1)", dated Apr. 2018, pp. 1-38.

Khaled Mammou et al, "Input Contribution", dated Oct. 8, 2018, pp. 1-42.

Benjamin Brass et al, "High Effeciency Video Coding (HEVC) Text Specification Draft 8", dated Jul. 23, 2012, pp. 1-86.

JunTaek Park et al, "Non-Overlapping Patch Packing in TMC2 with HEVC-SCC", dated Oct. 8, 2018, pp. 1-6.

Smael Daribo, et al., "Efficient Rate-Distortion Compression on Dynamic Point Cloud for Grid-Pattem-Based 3D Scanning Systems", 3D Research 3.1, Springer, 2012, pp. 1-9.

Cohen Robert A et al, "Point Cloud Attribute Compression Using 3-D Intra Prediction and Shape-Adaptive Transforms", dated Mar. 30, 2016, pp. 141-150.

Sebastian Schwarz, et al., "Emerging MPEG Standards for Point Cloud Compression", IEEE Journal on Emerging and Selected Topics In Circuits and Systems, vol. 9, No. 1, Mar. 2019, pp. 133-148.

Li Li, et al., Efficient Projected Frame Padding for Video-based Point Cloud Compression, IEEE Transactions on Multimedia, doi: 10.100/TMM.2020.3016894, 2020, pp. 1-14.

Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.

Kiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.

Siheng Chen, et al., "Fast Resampling of 3D Point Clouds via Graphs", arX1v:1702.06397v1, Feb. 11, 2017, pp. 1-15.

Nahid Sheikhi Pour, "Improvements for Projection-Based Point Cloud Compression", MS Thesis, 2018, pp. 1-75.

Robert Skupin, et al., "Multiview Point Cloud Filtering for Spatiotemporal Consistency", VISAPP 2014—International Conference on Computer Vision Theory and Applications, 2014, pp. 531-538.

Bin Lu, et al., ""Massive Point Cloud Space Management Method Based on Octree-Like Encoding"", Arabian Journal forScience Engineering, https://doi.org/10.1007/s13369-019-03968-7, 2019, pp. 1-15.

Wikipedia, ""k-d tree"", Aug. 1, 2019, Retrieved from URL: https://en.wikipedia.org/w.indec.php?title=Kd_tree&oldid=908900837, pp. 1-9.

"David Flynn et al., ""G-PCC: A hierarchical geometry slice structure"", MPEG Meeting, Retrieved from http://phenix.intevry.fr/mpeg/doc_end_user/documents/131_Online/wg11/m546//-v1-m54677_vl.zip, Jun. 28, 2020, pp. 1-9".

Tilo Ochotta et al, "Image-Based Surface Compression", dated Sep. 1, 2008, pp. 1647-1663.

U.S. Appl. No. 17/691,754, filed Mar. 10, 2022, Khaled Mammou.

U.S. Appl. No. 17/718,647, filed Apr. 12, 2022, Alexandros Tourapis, et al.

(56) References Cited

OTHER PUBLICATIONS

R. Mekuria, et al., "Design, Implementation and Evaluation of a Point Cloud Codec for Tele-Immersive Video", IEEE Transactions on Circuits and Systems for Video Technology 27.4, 2017, pp. 1-14.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
Tim Golla et al., "Real-time Point Cloud Compression", IROS, 2015, pp. 1-6.
Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Search Report and Written Opinion from PCT/US2021-038952, dated Sep. 29, 2021, pp. 1-16.
"G-PCC Future Enhancements," (Motion Picture Expert Group or ISO/IEC JTC1/SC29/WG11) dated Dec. 23, 2019, pp. 1-129.
Hannuksela M, "On Slices and Titles", dated Sep. 25, 2018, pp. 1-3.
David Flynn, "International Organisation for Standardisation Organisation International De Normalisation ISO/IEC JTC1/SC29/WG11 Coding of Moving Pictures and Audio", dated Apr. 2020. pp. 1-9.
Stefan Gumhold et al, "Predictive Point-Cloud Compression", dated Jul. 31, 2005, pp. 1-7.
Pierre-Marie Gandoin et al, "Progressive Lossless Compression of Arbitrary Simplicial Complexes", Dated Jul. 1, 2002, pp. 1-8.
Ruwen Schnabel et al., "Octree-based Point-Cloud Compression", Eurographics Symposium on Point-Based Graphics, 2006, pp. 1-11.
Yuxue Fan et al., "Point Cloud Compression Based on Hierarchical Point Clustering", Signal and Information Processing Association Annual Summit and Conference (APSIPA), IEEE, 2013, pp. 1-7.
Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.
Garcia, et al., "Context-Based Octree Coding for Point Cloud Video", 2017 IEEE International Conference on Image Processing (ICIP), 2017, pp. 1412-1416.
Merry et al., Compression of dense and regular point clouds, Proceedings of the 4th international conference on Computer graphics, virtual reality, visualisation and interaction in Africa (pp. 15-20). ACM. (Jan. 2006).
Lustosa et al., Database system support of simulation data, Proceedings of the VLDB Endowment 9.13 (2016): pp. 1329-1340.
Hao Liu, et al., "A Comprehensive Study and Comparison of Core Technologies for MPEG 3D Point Cloud Compression", arXiv:1912.09674v1, Dec. 20, 2019, pp. 1-17.

Styliani Psomadaki, "Using a Space Filing Curve For The Management of Dynamic Point Cloud Data in a Relational DBMS", Nov. 2016, pp. 1-158.
Remi Cura et al, "Implicit Lod for Processing and Classification in Point Cloud Servers", dated Mar. 4, 2016, pp. 1-18.
Yan Huang et al, Octree-Based Progressive Geometry Coding of Point Clouds, dated Jan. 1, 2006, pp. 1-10.
Khaled Mammou, et al., "G-PCC codec description v1", International Organisation for Standardisation, ISO/IEC JTC1/SC29/WG11, Oct. 2018, pp. 1-32.
"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.
G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.
Jianqiang Liu et al, "Data-Adaptive Packing Method for Compresssion of Dynamic Point Cloud Sequences", dated Jul. 8, 2019, pp. 904-909.
Jorn Jachalsky et al, "D4.2.1 Scene Analysis with Spatio-Temporal", dated Apr. 30, 2013, pp. 1-60.
Lasserre S et al, "Global Motion Compensation for Point Cloud Compression in TMC3", dated Oct. 3, 2018, pp. 1-28.
D. Graziosi et al, "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.
"Continuous improvement of study text of ISO-IEC CD 23090-5 Video-Based Point Cloud Compression" dated May 8, 2019, pp. 1-140.
Mehlem D. et al, "Smoothing considerations for V-PCC", dated Oct. 2, 2019, pp. 1-8.
Flynn D et al, "G-PCC Bypass coding of bypass bins", dated Mar. 21, 2019, pp. 1-3.
Sharman K et al, "CABAC Packet-Based Stream", dated Nov. 18, 2011, pp. 1-6.
Lasserre S et al, "On bypassed bit coding and chunks", dated Apr. 6, 2020, pp. 1-3.
David Flynn et al, "G-pcc low latency bypass bin coding". dated Oct. 3, 2019, pp. 1-4.
Chuan Wang, et al., "Video Vectorization via Tetrahedral Remeshing", IEEE Transactions on Image Processing, vol. 26, No. 4, Apr. 2017, pp. 1833-1844.
Keming Cao, et al., "Visual Quality of Compressed Mesh and Point Cloud Sequences", IEEE Access, vol. 8, 2020. pp. 171203-171217.
W. Zhu, et al., "Lossless point cloud geometry compression via binary tree partition and intra prediction," 2017 IEEE 19th International Workshop on Multimedia Signal Prcoessing (MMSP), 2017, pp. 1-6, doi: 1.1109/MMSP.2017.8122226 (Year 2017).
International Search Report from PCT Application No. PCT/US2021/038952, dated Jan. 5, 2023, pp. 1-9.

* cited by examiner

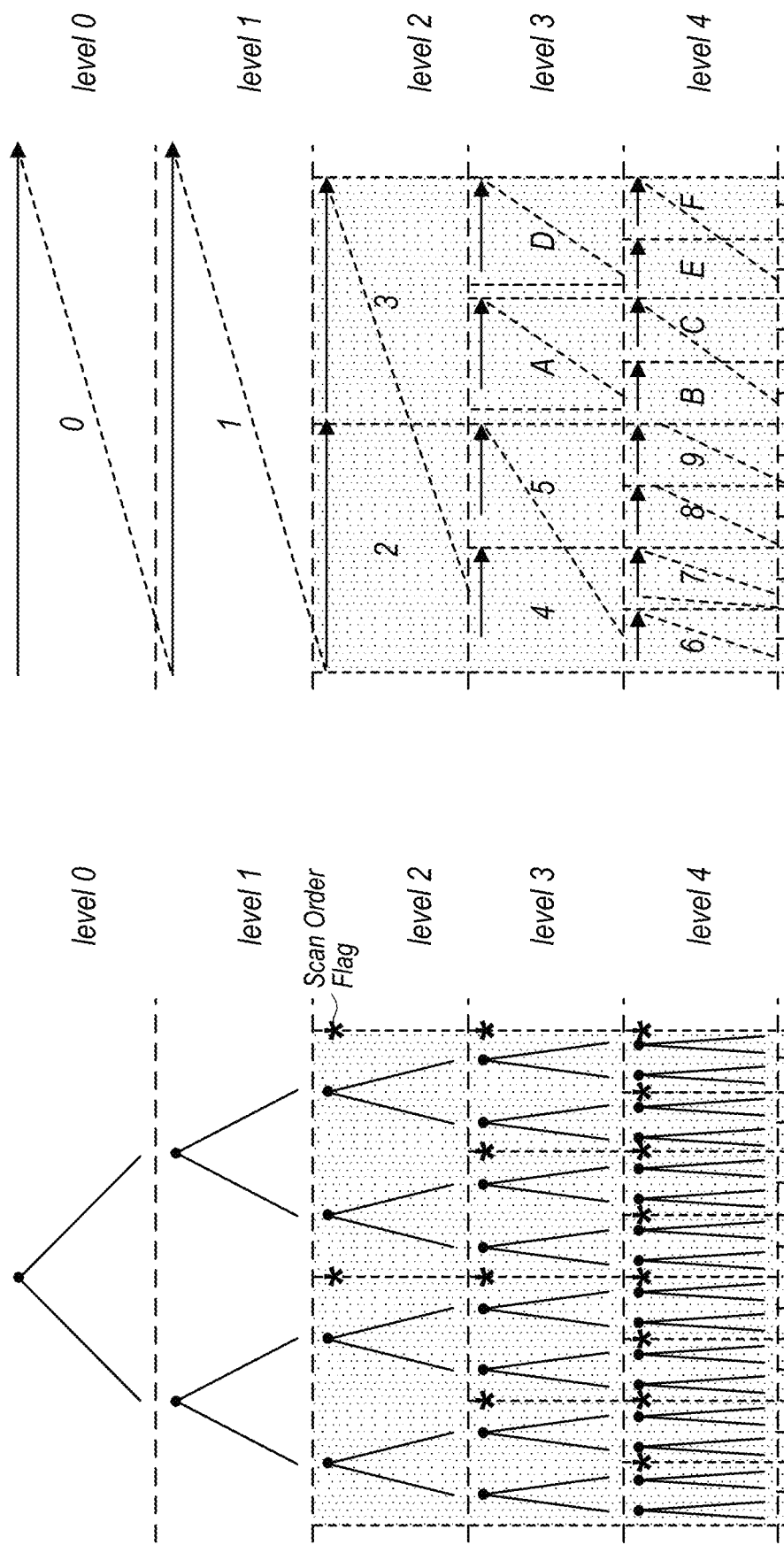

POINT CLOUD COMPRESSION USING OCTREES WITH SLICING

PRIORITY CLAIM

This application claims benefit of priority to U.S. Provisional Application Ser. No. 63/043,676, entitled "Point Cloud Compression Using Octrees with Slicing", filed Jun. 24, 2020, and which is incorporated herein by reference in its entirety.

BACKGROUND

Technical Field

This disclosure relates generally to compression and decompression of point clouds comprising a plurality of points, each having associated spatial and/or attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, a decoder stores program instructions that when executed by one or more processors cause the processors to receive a bit stream comprising a plurality of node groups of nodes of an octree structure generated for a point cloud that has been compressed. The nodes of the octree structure define spatial locations of points of the point cloud in three-dimensional space and each node group includes a sub-set of a set of nodes of the octree structure for the point cloud. Using the received bit stream, the program instructions of the decoder, when executed by the one or more processors, also cause the one or more processors to reconstruct a geometry of the point cloud based on the nodes included in the respective node groups of the bit stream. To perform the reconstruction, the program instructions cause the one or more processors to scan the nodes within a given node group according to a breadth first scan order and select a next subsequent node group to evaluate according to a depth first scan order. For example, scanning nodes within a node group according to a breadth first scan order may improve decoding efficiencies for decoding entropy encoded occupancy information for the nodes of the node group, by allowing the entropy encoder to use contexts determined for neighboring nodes to inform the entropy decoding process. At the same time, limiting the breadth first scan order to the nodes included in the node group may reduce memory requirements at the decoder to buffer a large number of nodes being evaluated, such as to determine entropy decoding contexts. Additionally, selecting a next node group to evaluate in a depth first scan order may improve resiliency of the compressed/encoded point cloud. For example arrival at leaf nodes may depend on fewer higher lever node groups than would be the cause if node groups were selected for evaluation according to a breadth first scan order. The leaf nodes may define locations of output points to be included in the reconstructed point cloud. Therefore relying on fewer node groups to reach a leaf node may reduce a probability that an output point cannot be determined because an intervening node group upon which the leaf node depends was lost, for example in transmission of the compressed point cloud.

In some embodiments, an encoder stores program instructions that when executed by one or more processors cause the processors to receive a point cloud to be compressed, wherein the point cloud comprises a plurality of points in three-dimensional space. To compress the point cloud, the program instructions of the encoder cause the one or more processors to generate an octree structure that comprises occupancy information for nodes of the octree structure, wherein the occupancy information indicates whether cubes or sub-cubes at a given level of the octree structure are occupied or non-occupied by one or more points of the point cloud. The program instructions of the encoder also cause the one or more processors to group the nodes of the octree into a plurality of node groups, wherein each node group comprises a sub-set of the nodes of the octree structure. Additionally, the program instructions of the encoder cause the one or more processors to generate a bit stream comprising encoded occupancy information for nodes of the octree included in the node groups, wherein the nodes within a given node group are organized according to a breadth first scan order, and wherein occupancy information for nodes of a subsequent node group to be evaluated are selected according to a depth first scan order between node groups.

In some embodiments, a decoder additionally, or alternatively, stores program instructions that when executed by one or more processors cause the one or more processors to receive a bit stream comprising a slice of an octree structure for a point cloud, wherein the octree structure for the point cloud comprises a set of nodes that define spatial locations of points of the point cloud, and wherein the slice comprises a sub-set of the set of nodes of the octree structure and a flag indicating an end of the slice. The bit stream also includes two or more additional slices of the octree structure for the point cloud, wherein the two or more additional slices each comprise additional respective sub-sets of the set of nodes of the octree structure and additional respective flags indicating respective ends of the two or more additional slices. In some embodiments, the slice or the two or more additional slices may each include multiple node groups. Additionally, the bit stream also includes, for at least the two or more additional slices, an indication of a position in the octree structure for at least one of the nodes of the respective slice, wherein the indicated position is indicated using a reference to a particular tree level of the octree structure and a spatial position within the tree level or a reference to a particular tree level of the octree structure and a node index position within the tree level. Using the received bit stream, the program instructions of the decoder further cause the one or more processors to reconstruct a geometry of the point cloud, wherein to reconstruct the geometry the respective sub-sets of nodes of the two or more additional slices are located in the octree structure by the decoder based on their respective indicated positions included in the bit stream. For example, once at least one node of a slice is properly located in the octree structure, the positions of the other nodes of the slice in the octree structure can be determined by the decoder based on their relationship to the node of the slice for which a position in the octree structure is indicated. In this way, if a slice is lost, or if slices are decoded in parallel, the nodes of the slices can be placed in the correct positions in the octree structure based on the indicated positions of the at least one nodes of the slices.

In some embodiments, an encoder additionally, or alternatively, stores program instructions that when executed by one or more processors cause the one or more processors to receive a point cloud to be compressed, wherein the point cloud comprises a plurality of points in three-dimensional space. The program instructions of the encoder also cause the one or more processors to generate an octree structure that comprises occupancy information for nodes of the octree structure, wherein the occupancy information indicates whether at a given level of the octree structure, cubes or sub-cubes of the octree at the given level are occupied or non-occupied by one or more points of the point cloud. Additionally, the program instructions of the encoder cause the one or more processors to organize the nodes of the octree structure into a plurality of slices, including a first slice of the octree structure comprising a sub-set of a set of nodes of the octree structure, and two or more additional slices of the octree structure, wherein the two or more additional slices each comprise additional respective sub-sets of the set of nodes of the octree structure. Also, the program instructions of the encoder cause the one or more processors to encode occupancy information for the nodes of the octree included in the first slice and the two or more additional slices and generate a bit stream for a compressed version of the point cloud. The bit stream includes the encoded occupancy information for the nodes included in the first slice and a flag indicating an end of the first slice and the encoded occupancy information for the nodes included in the two or more additional slices and additional respective flags indicating respective ends of the two or more additional slices. Also, the bit stream includes, for at least the two or more additional slices, an indication of a position in the octree structure for at least one of the nodes of the respective slice. The indication is indicated using a reference to a particular tree level of the octree structure and a spatial position within the tree level or a reference to a particular tree level of the octree structure and a node index position within the tree level.

BRIEF DESCRIPTION OF THE DRAWINGS

FIG. 7 illustrates nodes of an octree structure grouped into a plurality of node groups, wherein flags indicate evaluation orders for selecting subsequent ones of the node groups to evaluate, according to some embodiments.

FIG. 8 illustrates node groups that are evaluated in a hybrid depth first/breadth first scan order, wherein the value of a flag or the lack of a flag, at an end of a node group signals whether a next node group to evaluate is to be selected according to the depth first or the breadth first scan order, and wherein nodes within the respective node groups are scanned according to the breadth first scan order, according to some embodiments.

FIGS. 11A and 11B also illustrate entropy context save points indicated for one or more nodes of a given slice, according to some embodiments.

FIGS. 12A and 12B also illustrate entropy context save points indicated for one or more nodes of a given slice, wherein at least some of the slices are entropy dependent slices that depend from a common previous slice, according to some embodiments.

Figure 1:
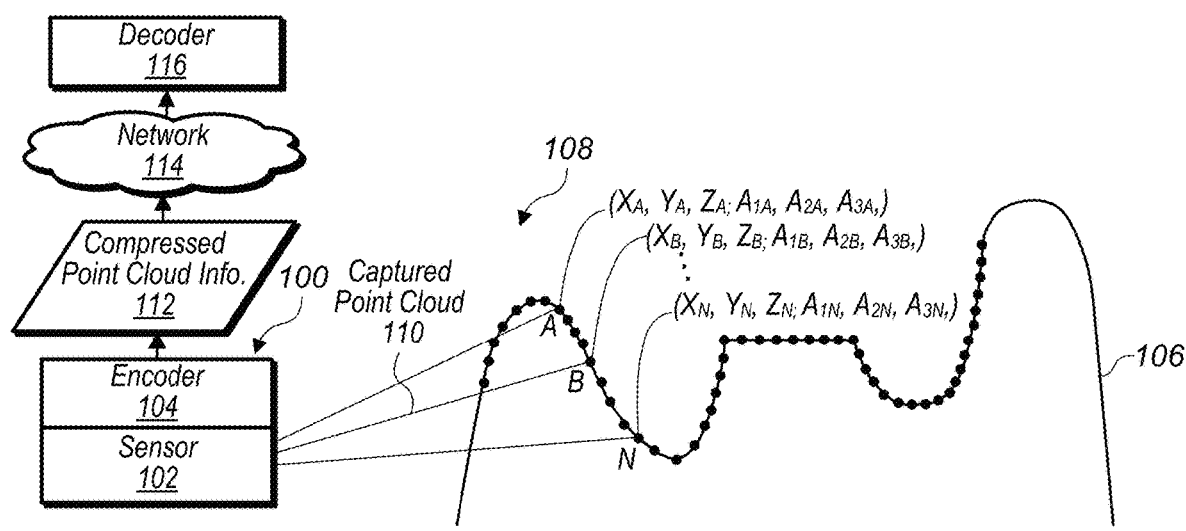
FIG. 1 illustrates a system comprising a sensor that captures information for points of a point cloud and an encoder that compresses attribute information and/or spatial information of the point cloud, where the compressed point cloud information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed spatial and/or attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed spatial information for a point cloud via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point cloud geometries.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud file. For example, in some embodiments, a gyroscope or accelerometer, may capture motion information to be included in a point cloud file as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes spatial information of a point cloud in addition to compressing attribute information for attributes of the points of the point cloud. For example, to compress spatial information an octree may be generated wherein, respective occupied/non-occupied states of each cube and/or sub-cube of the octree are encoded. Note that the cube/sub-cubes of the octree may correspond to nodes of an octree structure, wherein each node is indicated as an occupied or non-occupied node based on whether or not any of the points of the point cloud fall within a volume represented by the cube or sub-cube corresponding to the given node This sequence of encoded occupied/unoccupied states for sub-cubes may be encoded as occupancy symbols for nodes o the octree that convey spatial information for points of a point cloud to a decoder.

Figure 14A:
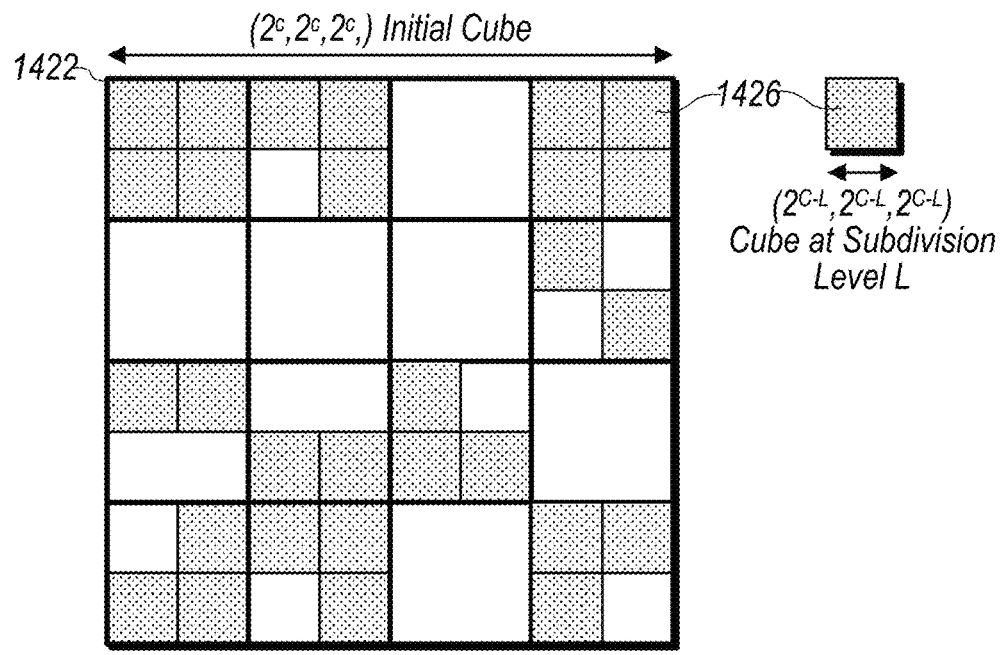
FIG. 14A illustrates an example cube and sub-cubes that may be used at different levels of an octree, wherein a node at a given level of the octree structure is indicated as occupied if a point is included in a cube or sub-cube volume corresponding to the node and is indicated as unoccupied if a point is not included in the cube or sub-cube volume corresponding to the node, according to some embodiments.
Figure 14B:
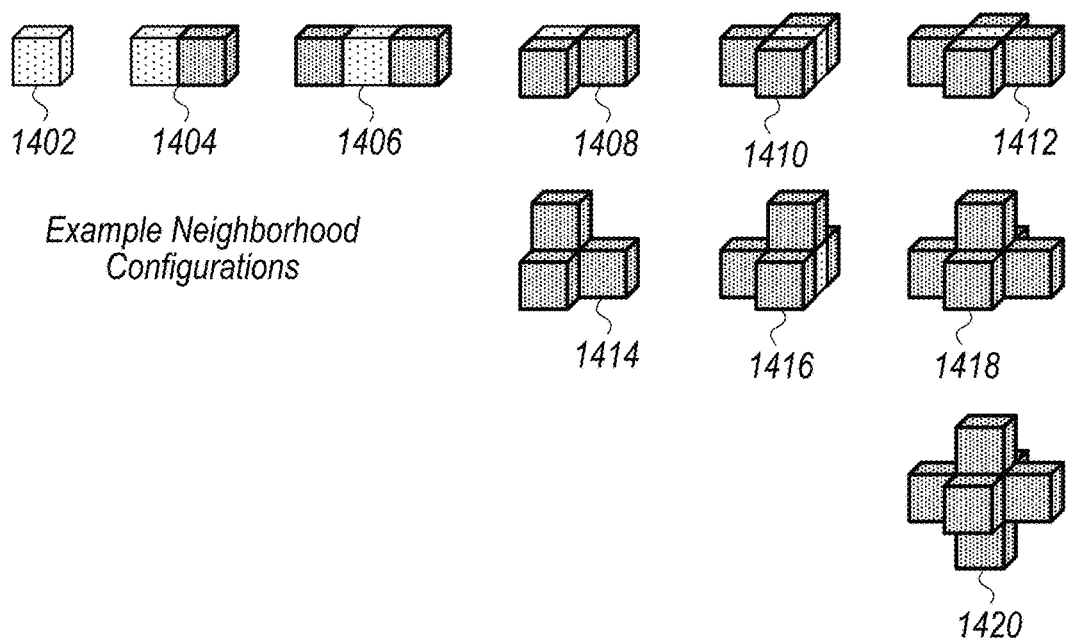
FIG. 14B illustrates example neighboring configurations for a cube or sub-cube corresponding to a given node of an octree, wherein the neighborhood configurations are used to determine entropy encoding/decoding context for encoding and decoding occupancy information for the given node, according to some embodiments.

In some embodiments, an encoder and/or decoder may determine a neighborhood occupancy configuration for a given cube corresponding to a node of an octree for which occupancy information is being encoded or decoded. The neighborhood occupancy configuration may indicate occupancy states of neighboring cubes that neighbor the given cube corresponding to the node for which occupancy information is being encoded or decoded. For example, a cube with for which neighboring cubes are occupied is more likely to also include occupied sub-cubes than a cube for which neighboring cubes are un-occupied. As shown in FIG. 14B and discussed in more detail below, there are various possible neighborhood occupancy configurations for a given cube corresponding to a node for which occupancy information is being encoded.

In some embodiments, an encoder and/or decoder may map particular neighborhood occupancy configurations to particular encoding contexts, wherein different encoding contexts are used to encode (or decode) occupancy information for nodes of an octree structure corresponding to cubes/sub-cubes having different neighborhood occupancy configurations. For example, FIG. 14B illustrates 10 possible neighborhood occupancy configurations. In some embodiments, the encoder, or decoder, may utilize fewer than 10 encoding/decoding contexts. For example, in some embodiments a set of more frequently occurring neighborhood occupancy configurations may each be associated with a separate encoding/decoding context and one or more sets of less frequently occurring neighborhood occupancy configurations may be grouped together and associated with one or more shared encoding/decoding contexts. For example, in some embodiments, the number of encoding/decoding contexts may be reduced to 6 encoding contexts, wherein the five most frequently occurring neighborhood occupancy configurations are each assigned a different encoding context, and the remaining five less frequently occurring neighborhood occupancy configurations share a common encoding context.

FIG. 1 illustrates a system comprising a sensor that captures information for points of a point cloud and an encoder that compresses spatial and/or attribute information of the point cloud, where the compressed spatial and/or attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, the locations of the points of the point cloud in 3D space may define a geometry of the point cloud, e.g. spatial locations of the points of the point cloud. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed point cloud information 112) that is transmitted via network 114 to decoder 116. In some embodiments, a compressed version of the point cloud, such as compressed point cloud information 112, may be included in a common compressed point cloud that also includes compressed spatial information for the points of the point cloud or, in some embodiments, compressed spatial information and compressed attribute information may be communicated as separate files. In some embodiments, the compressed point cloud information 112 may include a bit stream for the compressed point cloud as described in more detail herein.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Figure 2:
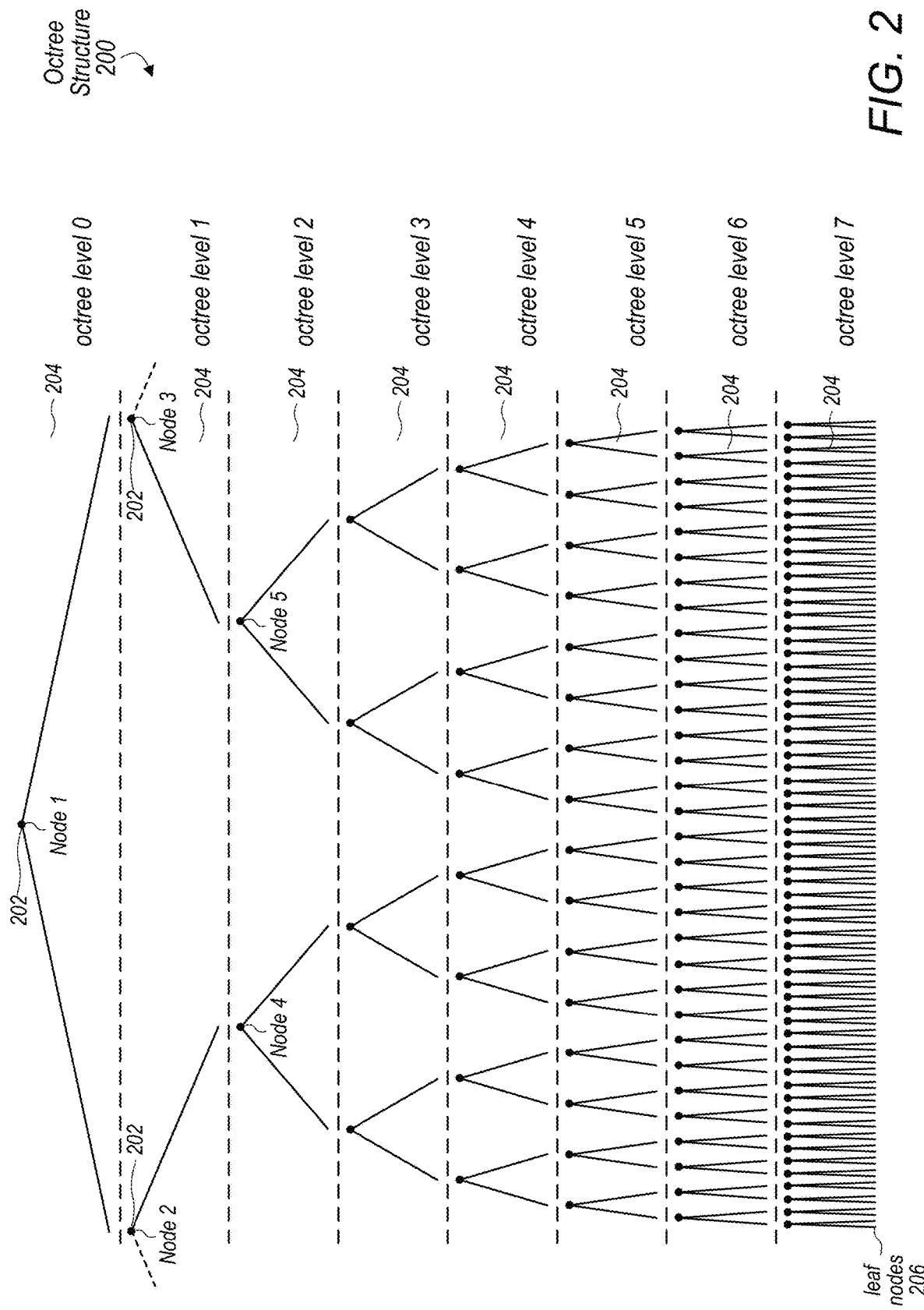
FIG. 2 illustrates an example of a simplified octree structure, according to some embodiments.

FIG. 2 illustrates an example simplified octree structure, according to some embodiments.

It should be noted that that for ease of illustration a binary tree has been shown to represent a simplified octree. However, in three-dimensional space each node of the illustrated octree structure may include more child nodes than shown in the two-dimensional figures. Also, it should be noted that while the description herein is described in terms of an octree structure, in some embodiments any other suitable tree structure may be used.

Octree structure 200 includes nodes 202 and octree levels 204. The octree structure includes parent nodes and child nodes. For example, the node 1 of octree level 0 includes two child nodes (nodes 2 and 3) of octree level 1. Likewise node 2 has a child node 4 in octree level 2 and node 3 had a child node 5 in octree level 2. In some embodiments, a node of the octree may have between 1 and 8 child nodes. Also, each node of an octree represents a volume of space defined by a three dimensional cube or sub-cube, wherein each child node is a sub-cube of a cube corresponding to the parent node. In an octree in three-dimensional space, each cube of a parent node is divided into eight sub-cubes corresponding to child nodes in the progression from one octree structure level to the next. In this way, the volumes associated with the lower level nodes fit within the larger volumes of the upper level nodes. For example, all of the nodes shown in FIG. 2 have volumes that may fit within the volume covered by node 1. As an example, FIG. 14A illustrates cubes and sub-cubes at different subdivision levels (e.g. octree structure levels). Note that FIG. 14A is illustrated in 2D for simplicity, but the cubes described herein may be three-dimensional cubes.

To represent spatial information for a point cloud, the spatial locations of the point cloud may be overlaid into the volumes of the respective nodes of the octree structure. If a given node or child node of a given node includes in its respective volume at least one point of the point cloud, the node may be considered to be occupied. Otherwise the node may be considered to be non-occupied. For example, a point cloud may include sparse regions wherein there are volumes of space that do not include any points. For these portions of the point cloud, cube and sub-cube volumes corresponding to nodes of the octree structure may be non-occupied. The octree nodes with occupied cubes at a given level of the octree structure may continue to be divided into child nodes with sub-cubes that correspond to nodes of a next lower level of the octree structure until a child node sub-cube includes a single point of the point cloud. In this way, the location in space of the single points of the point cloud may be defined by the location of the child nodes containing the single points in the octree. For example, leaf nodes 206 may define locations of individual points in 3D space.

For each parent node, occupancy information for child nodes may be encoded as an encoded word, for example if there are there 2 occupied child nodes for a parent node, 3 occupied child nodes for a parent node, etc. this information may make up occupancy information for the parent node that may be encoded as an encoded word. In some embodiments, an entropy encoder may be used to encode/decode occupancy information, such as encoded words for nodes of an octree structure.

In a given region of an octree structure, nodes that are close to one another (e.g. neighboring nodes) may have similar occupancy states. For example, if the point cloud is defining a flat surface, such as a wall, nodes of the octree structure falling along the wall may have similar occupancy states. These similarities in occupancy states may be advantageously used to improve encoding efficiency of occupancy information, for example when using an entropy encoder/decoder and using occupancy states of neighboring nodes to inform an entropy encoding/decoding context used to encode or decode occupancy information for a given node of the octree structure using the entropy encoder/decoder.

For example, FIG. 14B illustrates example neighborhood configurations for a given node for which occupancy information is being entropy encoded/decoded (e.g. the node being encoded/decoded corresponds to the lightly colored cube), wherein the darker colored cubes indicate occupied neighboring cubes corresponding to neighboring nodes of the given node in the octree structure. For example in neighborhood configuration 1402 a node corresponding to the lightly colored cube may not have any neighboring nodes/cubes that are occupied. In neighborhood configuration 1404 only one neighboring node/cube on one side of the node/cube for which occupancy information is being encoded may be occupied. In 1406 cubes on either side of the node/cube for which occupancy information is being encoded/decoded may be occupied. Similarly other neighborhood configurations are illustrated for 1408, 1410, 1412, 1414, 1416, 1418, and 1420.

By knowing the neighborhood configurations/occupancy information of neighboring nodes of a node for which occupancy information is being encoded/decoded an entropy encoder/decoder may improve entropy encoding performance for the node for which occupancy information is being encoded. However, in order to determine the occupancy information for neighboring nodes, an encoder or decoder may have to store determined occupancy information to a memory buffer for the neighboring nodes for use in determining entropy coding context for subsequently evaluated nodes that neighbor the neighboring nodes for which occupancy information has already been determined. While, knowing neighborhood node occupancy configurations may improve entropy encoding efficiency, there may be tradeoffs in terms of an amount of memory space that is needed to maintain a large amount of buffered occupancy information for neighboring nodes. Also, requiring decoding dependencies between nodes may increase complexity and/or slow down encoding and decoding of occupancy information, wherein nodes that depend on entropy contexts from other encoded or decoded nodes must wait for the other encoded/decoded nodes to be evaluated before the dependent nodes can be evaluated. Also, if a portion of the octree structure is lost in transmission, nodes with entropy context dependencies on other nodes that were lost in transmission may not be able to have their occupancy information decoded.

Thus as described herein, grouping nodes into node groups that have entropy context dependencies within the node group, but limited dependencies outside of the node group may balance entropy encoding efficiency against memory buffer requirements and/or complexity and processing limitations due to entropy context dependencies.

Also, as further described herein, organizing node groups into slices that correspond in size to data transmission units, such as internet protocol (IP) packets, and which include header information that defines a location of a starting point of the slice in the octree structure and that includes in indication of a starting entropy context to be used for the slice, may provide resilience such that if a slice is lost in transmission, a point cloud may still be reconstructed at a decoder without the missing slice. Though, a portion of the point cloud corresponding to the missing slice may be rendered at a lower resolution than would have been the case if the slice had not been lost. This is in comparison to other octree encoder/decoders that require re-transmission of the full octree structure if a portion of the octree structure is lost in transmission. Additionally, because a slice can be independently placed in the octree structure and because the slice has an entropy context that does not necessarily depend on an immediately preceding slice being encoded/decoded, occupancy information for nodes of multiple slices of an octree structure may be determined in parallel. Also, in some embodiments, scalable decoding may be enabled using such slices. For example, if a lower resolution version of the point cloud is acceptable, not all slices may be decoded. However, because the slices can be independently located in the octree structure and have an entropy context that does not necessarily depend on an immediately preceding slice, a scaled version of the point cloud can be reconstructed without using all slices of the octree structure to reconstruct the scaled version of the point cloud.

Figure 3:
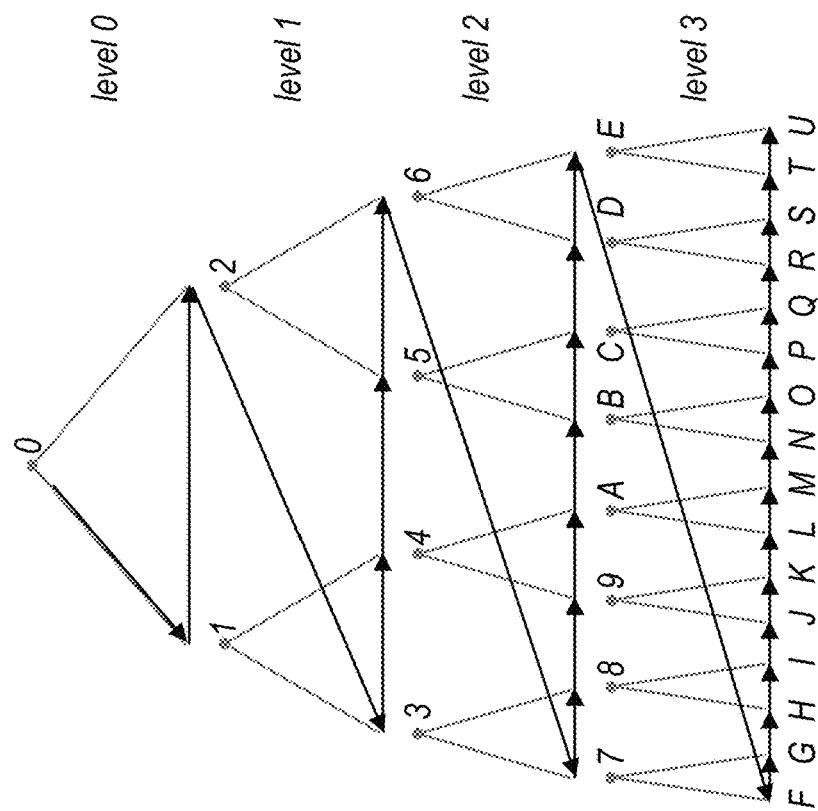
FIG. 3 illustrates an example breadth first scan order of nodes of an octree structure, according to some embodiments.

FIG. 3 illustrates an example breadth first scan order of nodes of an octree structure, according to some embodiments.

As used herein, a breadth first scan order follows an order as shown in FIG. 3, wherein at a given octree level, such a level 1, nodes (or node groups) of the octree level are sequentially evaluated until an end of the octree level is reached, at which point the breadth first scan order proceeds to the next lower octree level of the octree structure. For example, in FIG. 3 nodes are evaluated in an order as indicated by the numbers and letters shown in the figure.

Figure 4:
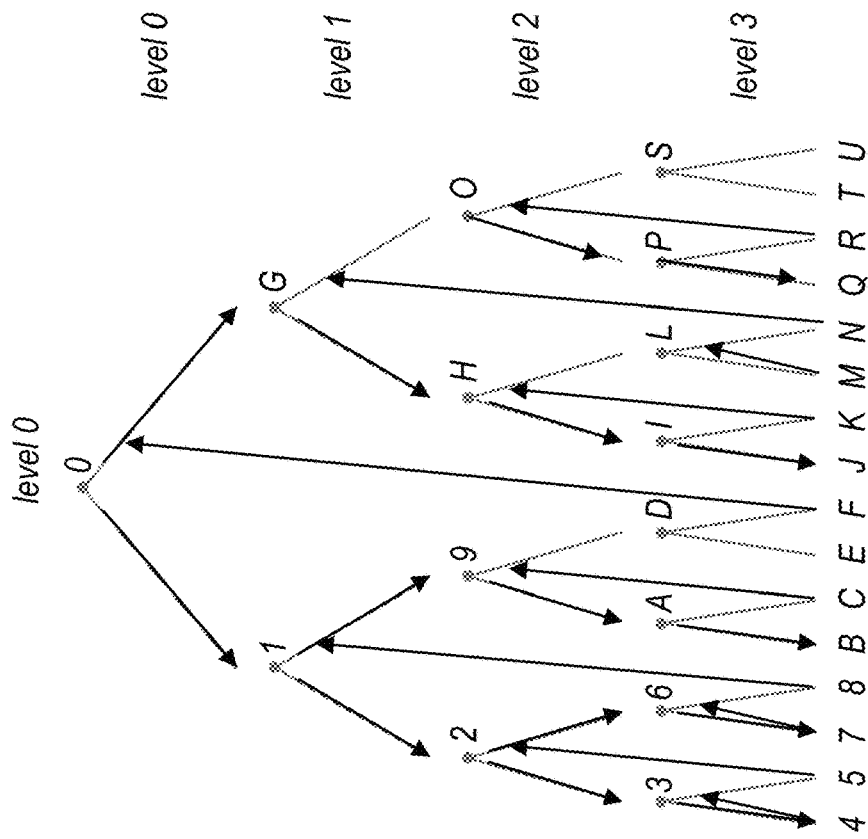
FIG. 4 illustrates an example depth first scan order of nodes of an octree structure, according to some embodiments.

Said another way, in a breadth first scan order, nodes (or node groups) are scanned at a same level of the octree structure, and if an end of the nodes (or node groups) in the same level of the octree structure is reached the scan order proceeds to scan sequential nodes (or node groups) at a next lower level of the octree structure FIG. 4 illustrates an example depth first scan order of nodes of an octree structure, according to some embodiments.

In a depth first scan order, as used herein, nodes (or node groups) are evaluated in sequential levels of the octree structure until a leaf node is reached, at which point the scan order bounces up, then proceeds to go down to a sibling node at a lower level. For example, as show in FIG. 4, when a leaf node is reached at 4, the scan order bounces back up to 3 (which has already been evaluated) and then proceeds back down to 5 which is a sibling node to 4, which was already evaluated. Also as can be seen, after 8, the depth first scan order bounces back up to 1, because all of the nodes under 2 have been evaluated, at which point the depth first scan order then proceeds down a sibling path by proceeding to 9 and the positions beneath 9.

Said another way, in a depth first scan order a next node (or node group) that comprises child nodes at a lower level of the octree structure than parent nodes included in a current node (or node group) being evaluated is selected as a next node (or node group) to evaluate, wherein if the octree structure does not include child nodes at a lower level of the octree structure for the nodes included in the current node (or node group) being evaluated, the depth first scan order reverts to a node (or node group) comprising parent nodes of the nodes of the current node (or node group) being evaluated, wherein the parent nodes are at a higher level of the octree structure than the nodes of the current node (or node group) being evaluated and then the depth first scan order proceeds back down to a node (or node group) comprising sibling nodes of the nodes of the current node (or node group) being evaluated at a same level of the octree structure, if the node (or node group) comprising the parent nodes has already been evaluated.

Figure 5:
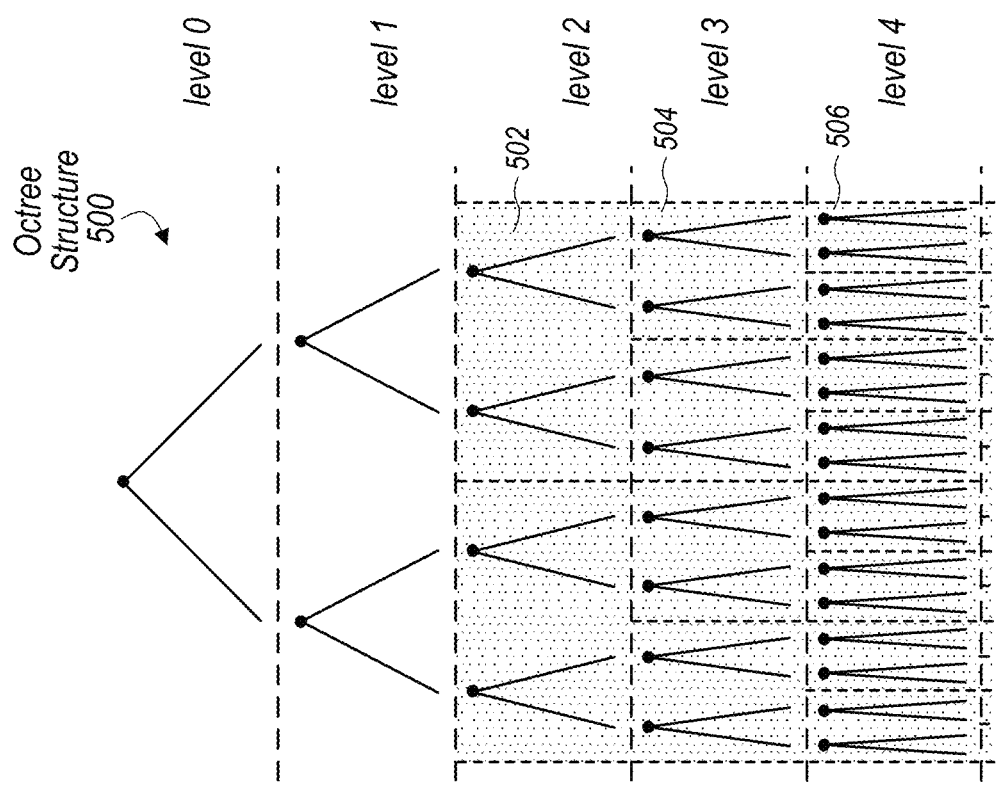
FIG. 5 illustrates nodes of an octree structure grouped into a plurality of node groups, according to some embodiments.

FIG. 5 illustrates nodes of an octree structure grouped into a plurality of node groups, according to some embodiments.

As discussed above, in some embodiments, nodes of an octree structure may be organized into node groups and in some embodiments the node groups may be organized together to form slices, wherein the slices correspond in size to a payload of a data transmission unit, such as an IP packet.

In some embodiments, a node group may define a volume of space comprising volumes of cubes or sub-cubes corresponding to nodes included in the node group. Note that a node group may represent a given volume in space regardless as to whether or not the nodes of the node group are occupied or non-occupied nodes.

For example, FIG. 5 illustrates octree structure 500, wherein the nodes of the octree structure are grouped into two node groups 502 at level 2, four node groups 504 at level 3, and eight node groups 506 at level 4. Note that in some embodiments, node groups at a given level of the octree structure may correspond to a same volume size in space, but node groups at different levels of the octree structure may correspond to different volume sizes in space. For example, as there are more nodes in level 4 than in level 2, the node groups 506 may correspond to smaller volumes than the node groups 502.

In some embodiments, entropy contexts used for encoding/decoding occupancy information for a node may utilize neighboring nodes within a node group to determine the entropy contexts, but may limit a search for neighboring nodes for computing entropy contexts to those nodes included in the same node group as a given node for which occupancy information is being encoded/decoded. As discussed above, this may simplify dependencies between nodes and limit an amount of occupancy information for nodes that needs to be stored to a memory buffer for use in determining entropy encoding/decoding contexts.

Figure 6:
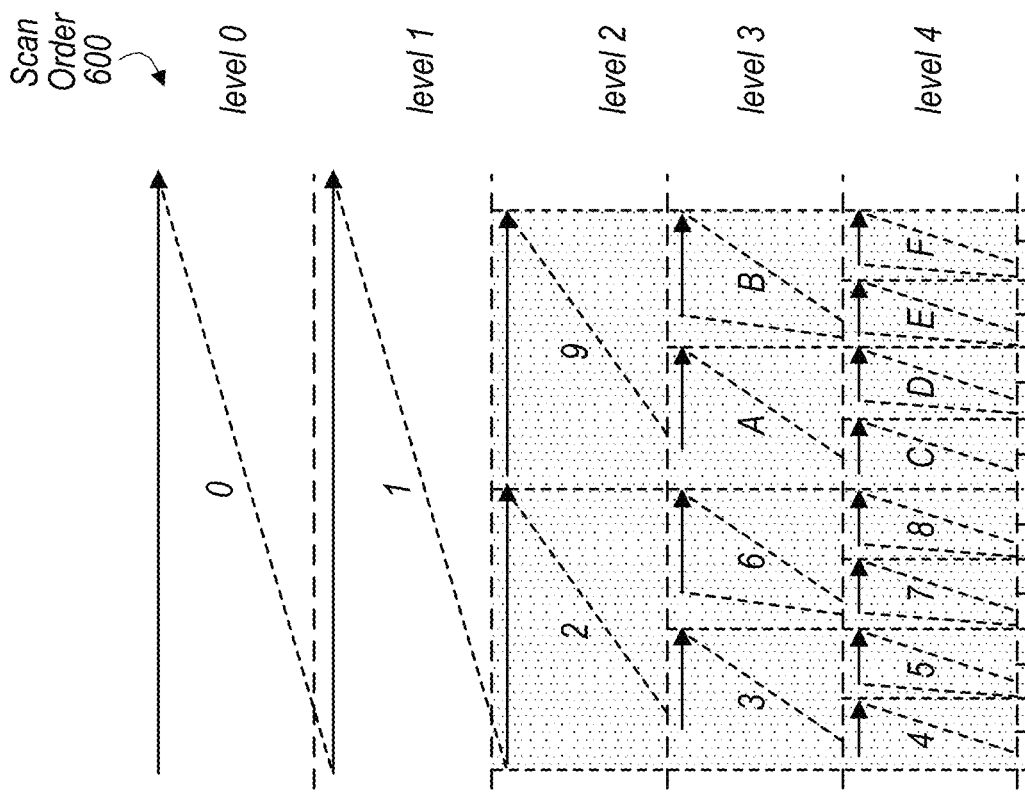
FIG. 6 illustrates a depth first scan order for selecting node groups to evaluate, wherein the nodes within the respective node groups are scanned according to a breadth first scan order, according to some embodiments.

FIG. 6 illustrates a depth first scan order for selecting node groups to evaluate, wherein the nodes within the respective node groups are scanned according to a breadth first scan order, according to some embodiments.

In some embodiments, nodes within a node group may be scanned according to a breadth first scan order, but next subsequent node groups to evaluate may be selected based on either a breadth first scan order or a depth first scan order.

For example, FIG. 6 illustrates with the arrows at the top of the node groups that nodes within a node group are scanned according to the breadth first scan order. However, the dotted lines indicate that next sequential node groups to be evaluated are selected according to a depth first scan order. For example, after evaluating node group 2, the depth first scan order selects node group 3 at a lower level of the octree structure to be evaluated next (as opposed to node group 9 which is at a same octree level as node group 2). In this way fewer node groups may be required to be evaluated before reaching leaf nodes. For example, the leaf nodes of node group 4 may be reached after evaluating four node groups, whereas if the node groups were to be evaluated in a breadth first scan order, node groups 0, 1, 2, 9, 3, 6, A, and B (e.g. eight node groups) would have had to have been evaluated before reaching leaf nodes of node group 4. Thus, there would have been nearly double a number of higher level nodes above the leaf nodes, any one of which if lost in transmission would adversely affect determining the locations of the leaf nodes for reconstruction. As can be seen, resilience is improved as compared to a pure breadth first scan order arrangement. However, at least some of the entropy coding efficiencies of using neighboring nodes to determine entropy contexts are not lost by still enabling breath first scan ordering within node groups.

In some embodiments a hybrid scan order of breadth first within a node group and depth first for selecting a next node group to be evaluated may be used at both an encoder and decoder, for example without having to signal scan order.

FIG. 7 illustrates nodes of an octree structure grouped into a plurality of node groups, wherein flags indicated evaluation orders for selecting subsequent ones of the node groups to evaluate, according to some embodiments.

In some embodiments, a dynamic scan order may be used for selecting node groups to be evaluated next. For example, instead of always selecting a next node group to be evaluated next according to a depth first scan order, a flag may be set at the end of a node group to indicate a scan order to be used to select a next node group to be evaluated. Note that while FIG. 7 shows a flag for each node group, in some embodiments a flag may be asserted if a first scan order is to be used (e.g. depth first scan order) and a flag not being asserted indicate a deviation from the default scan order (e.g. breadth first scan order). For example, the flag may be inferred to indicate one of the scan orders if not asserted and may indicate the other one of the scan orders if asserted.

FIG. 8 illustrates node groups that are evaluated in a hybrid depth first/breadth first scan order, wherein a flag at an end of node group signals whether a next node group to evaluate is to be selected according to the depth first or the breadth first scan order, and wherein nodes within the respective node groups are scanned according to the breadth first scan order, according to some embodiments.

As can be seen in FIG. 8, at level 2 instead of proceeding to node group 4 which is at the next lower level under node group 2, the flag may indicate to follow a breadth first scan order following node group 2, such that the next node group to be evaluated (e.g. node group 3) is the next sequential node group at the same level of the octree as the node group 2. However, at level 3, after evaluating node group 3, a flag (or lack of a flag) may indicate to select a next node group for evaluation according to a depth first scan order, e.g. node group 4 at the next lower level of the octree structure may be selected.

In some embodiments, node group selection orders may be selected to balance tradeoffs between resiliency and memory buffer requirements/dependency requirements. Also, in some embodiments, different node groups may include different amounts of occupied nodes that require different amount of bits to encode. Thus, in some embodiments, an encoder may alternate between selecting a next node group to evaluate according to a depth first scan order or a breadth first scan order in order to select a sequential node groups to include in a slice that fill the slice without overfilling the slice.

Figure 9:
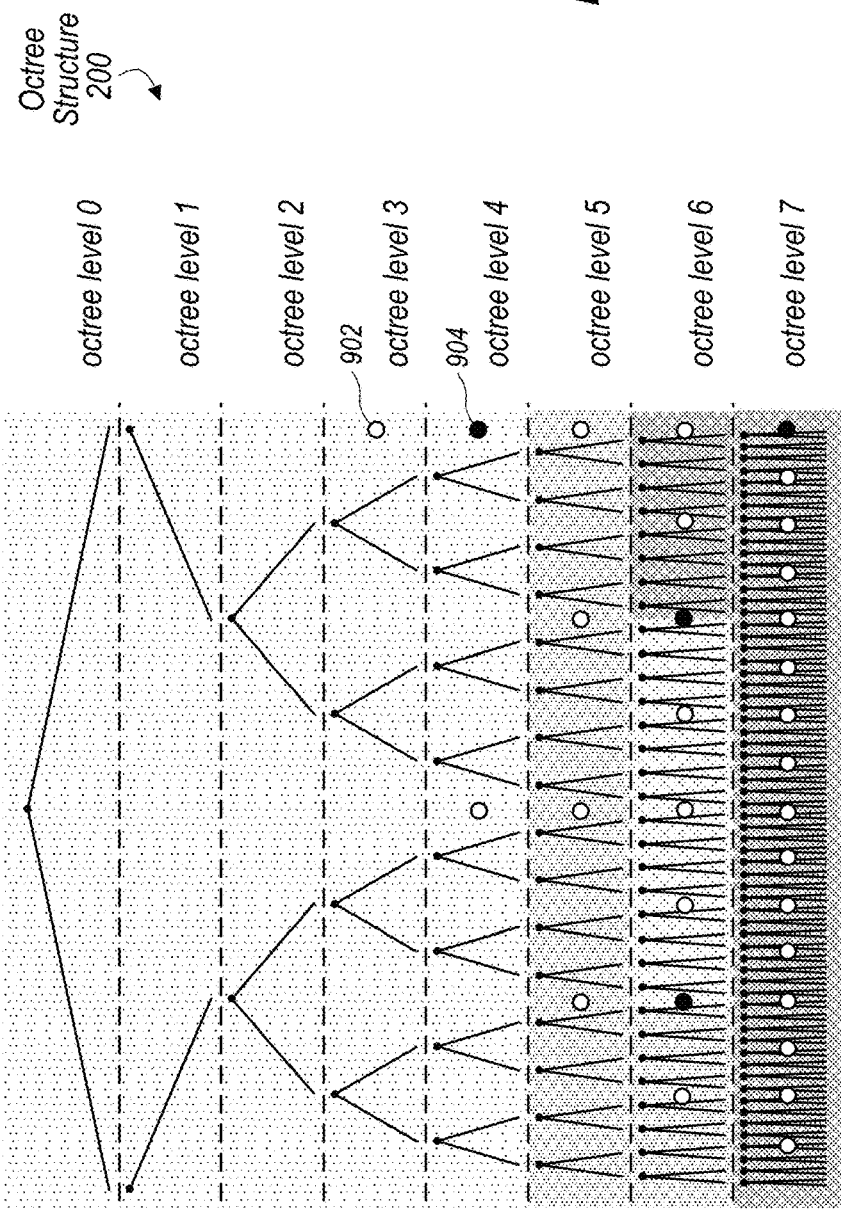
FIG. 9 illustrates node groups organized into a plurality of slices, wherein each node group contains a flag indicating whether the node group is a last node group of a given slice, according to some embodiments.

FIG. 9 illustrates node groups organized into a plurality of slices, wherein each node group contains a flag indicating whether the node group is a last node group of a given slice, according to some embodiments.

In some embodiments, the node groups as described above may be grouped into slices. Also each node group may include a flag indicating whether it is the last node group of a given slice (such a flag may be called an end-of-slice flag). For example, FIG. 9 illustrates slices made up of sets of node groups, wherein the different slices are represented by different shading/hatch patterns. Flags 902 (that show an open circle) indicate that a node group is not a last node group of a slice, whereas flags 904 (that show a filled in circle) indicate a last node group of a slice. Note that in some embodiments, a slice may include node groups at more than one octree level of an octree structure 200.

In some embodiments, the value of a next node group scan order flag may be deduced, or not, by a rule present in the encoder and encoder. An encoder or decoder inspects the rule at the end of each node group and determines whether the rule forces a particular scan order or not. If the rule does not apply, a flag is signaled indicating a particular order. In one embodiment a rule states that if an end-of-slice flag is asserted at a collocated position in the, or a, preceding level, the tree traversal proceeds to next node group in a depth-first order. Another rule may state that if a node group scan order flag is asserted to be depth-first, or is deduced to have been depth-first by another rule, at a collocated position in the, or a, preceding level, the tree traversal proceeds to the next node group in a depth-first order. Such rules permit, for example, maintaining a hierarchy of slices that avoid overlapping in order to increase resilience to lost or corrupt slices without the overhead of signaling an explicit scan order. The presence of such rules may be communicated by way of additional flags signaled in a parameter set conveying parameters shared by one or more slices.

In some embodiments, in order to minimize any overhead from signaling last node group in slice flags, a rule may be present that indicates that the last node group in slice flag is not present unless an associated scan order flag (or rule) changes the tree traversal order.

In some embodiments, a header may be associated with a slice, wherein the header communicates parameters that are to be applied to node groups included in the slice. For example, a header may define a node group size for nodes groups included in a slice. Also, a header may include an indication as to where a reference node of the slice (e.g. a first node of the slice) should be positioned in the octree structure 200. In this way if an intermediate slice is lost, a subsequent slice can be placed in the octree structure even without the intermediate slice. In some embodiments, the reference position for the slice may be communicated in the header using a reference to a particular tree level of the octree structure and a spatial position within the tree level or by using a reference to a particular tree level of the octree structure and a node index position within the tree level. In some embodiments, the spatial position or index may be signaled relative to an index of nodes of a node group, or position relative to a positon of a node group, wherein the node group is within a particular tree level of the octree structure. In some embodiments, the spatial position or index may be signaled relative to the leaf nodes of a particular slice.

Also, in some embodiments, a node group size may be set at an octree level wherein node groups at a given octree level share a common size. In some embodiments, a node group size may be set at the start of each octree level within a given slice.

In some embodiments, a header for each slice may include an index value that assigns an order to the slice relative to the other slices of the octree structure 200. For example a first slice may be slice 1, a second slice may be slice 2, etc.

In some embodiments, a first slice may be referred to as an initial slice and may include a full set of header parameters. However, subsequent slices may have header information that depends from a previous slice. Thus, subsequent slice headers may be light weight and may indicate that it is a dependent slice and further indicate what slice header it depends from.

In some embodiments, entropy contexts may be re-set for a slice, in which case the re-set may be signaled in the header of the slice. Also, such slices may be referred to as entropy independent slices, in that they do not depend on an entropy state to be provided from a preceding slice. Conversely, some slices may use a starting entropy context that is inherited from a previous slice. Such slices may be referred to as entropy dependent slices.

Figure 10:
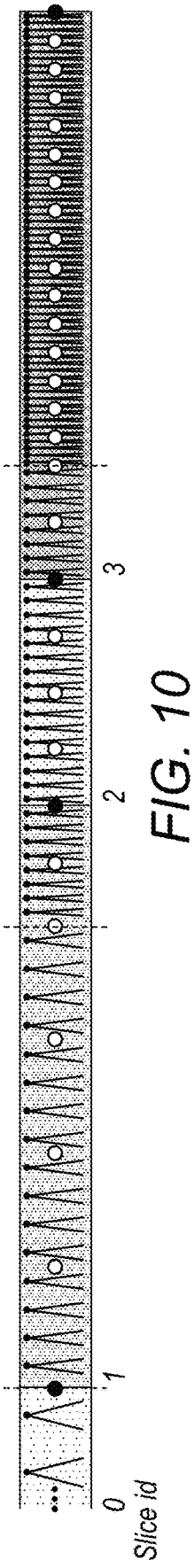
FIG. 10 illustrates node groups organized into a plurality of slices, wherein each node group contains a flag indicating whether the node group is a last node group of a given slice, and wherein the slices are arranged sequentially in an order in which they are to be received, for example by a decoder, according to some embodiments.

FIG. 10 illustrates node groups organized into a plurality of slices, wherein each node group contains a flag indicating whether the node group is a last node group of a given slice, and wherein the slices are arranged sequentially in an order in which they are to be received, for example by a decoder, according to some embodiments.

Figure 11A:
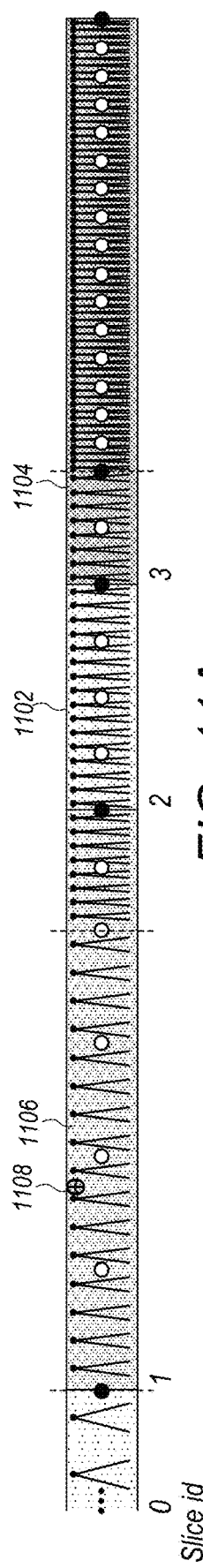
FIGS. 11A and 11B illustrate node groups organized into a plurality of slices, wherein each node group contains a flag indicating whether the node group is a last node group of a given slice.
Figure 11B:
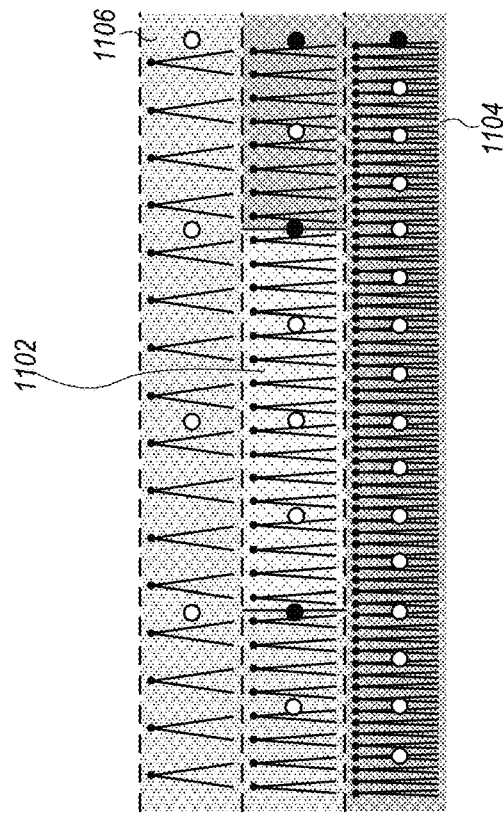

FIGS. 11A and 11B illustrate node groups organized into a plurality of slices, wherein each node group contains a flag indicating whether the node group is a last node group of a given slice. FIGS. 11A and 11B also illustrate entropy context save points indicated for one or more nodes of the slice, according to some embodiments.

For example, if slice 1102 is lost and slice 1104 is entropy independent, the portions of slice 1104 that are not under slice 1102 can still be decoded. For example, the portions of the slice 1104 that are child nodes from slice 1106 can still be decoded. Though, the nodes of slice 1104 that are child nodes under slice 1102 may not be decoded. Also, the nodes of slice 1104 at the bottom right that are subsequent to the nodes that are child nodes under slice 1102 may not be decoded because they have entropy dependencies on the nodes under 1102 that were not decoded.

In some embodiments, entropy dependent slices may have an entropy context for a starting node of the slice that is restored from a saved entropy context from a previous slice.

In some embodiments, entropy contexts/states to save to a memory buffer for use by subsequent slices may be implicit. For example, an entropy state for a last node of a slice may be saved or an entropy state for a last node of a given octree level may be saved. Also, in some embodiments, an encoder may mark a node of a slice for which an entropy state is to be saved for use by a subsequent slice. For example the flag 1108 (⊕) may be used to signal that an entropy context for a particular node of slice 1106 is to be saved to be used as an inherited entropy for slice 1102 or slice 1104.

In some embodiments, for a slice that spans more than one octree level, an entropy state for a last node in the penultimate octree level may overwrite an entropy state otherwise saved for the slice. Also, in some embodiments, a flag may be set to indicate that the entropy state for the last node in octree level is to overwrite the entropy context for a given slice, wherein if the flag is not set, the entropy context for the last node in the octree level is not used to overwrite the entropy context saved for the slice. In some embodiments, this process may be omitted if the end of a tree level coincides with the end of a slice.

Figure 12A:
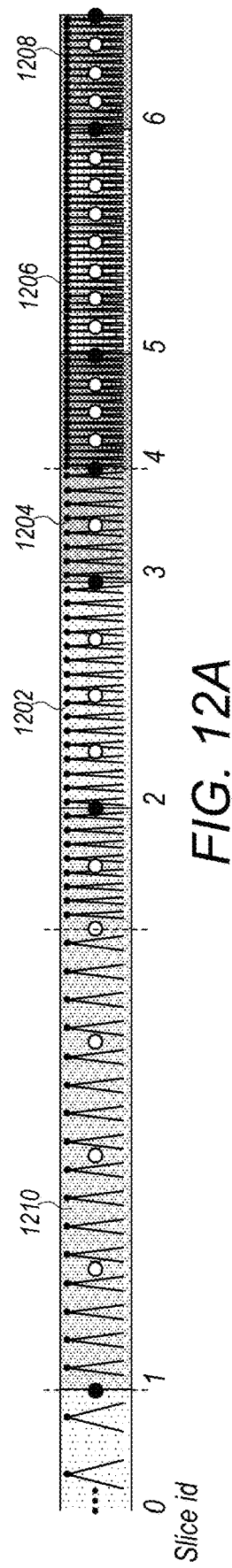
FIGS. 12A and 12B illustrate node groups organized into a plurality of slices, wherein each node group contains a flag indicating whether the node group is a last node group of a given slice.
Figure 12B:
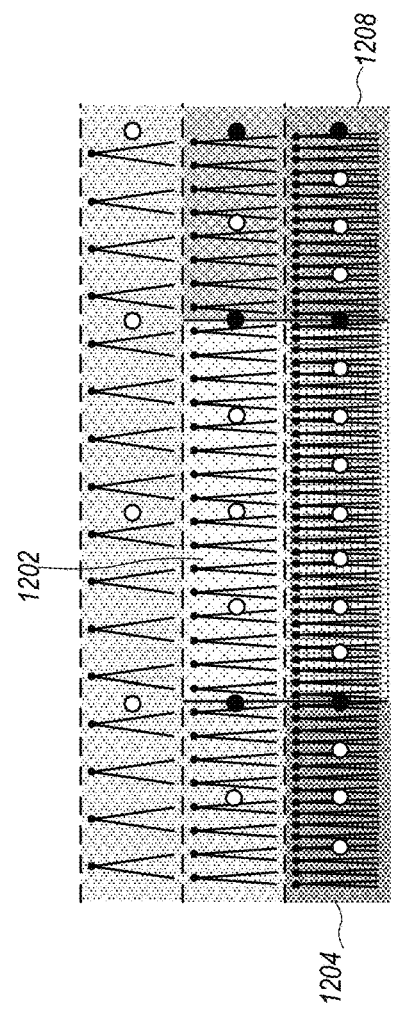

In some embodiments, an entropy dependent slice may re-store its entropy state from a saved entropy state for a preceding slice. However, in other embodiments an entropy dependent slice may restore its entropy state from a slice other than the immediately preceding slice. In some embodiments, this may be signaled as an index value for a slice from which to re-store its entropy context, or may be signaled relatively (e.g. 2 slices preceding). For example, slice 1104 may inherit the entropy state saved for node 1108 of slice 1106. Thus, if slice 1102 is lost, slice 1104 can still re-store its entropy state. In another embodiment, the slice from which to restore entropy state is inferred to be the slice that contains the parent node of the first node in the slice FIGS. 12A and 12B illustrate node groups organized into a plurality of slices, wherein each node group contains a flag indicating whether the node group is a last node group of a given slice. FIGS. 12A and 12B also illustrate entropy context save points indicated for one or more nodes of the slice, wherein at least some of the slices are entropy dependent slices that depend from a common previous slice, according to some embodiments.

As a further example of entropy dependent slices, if slices 1202, 1204, 1206, and 1208 are all entropy dependent slices that inherit their entropy state from slice 1210, if slice 1202 is lost, slices 1204 and 1208 can still be decoded because the starting entropy state for these slices is known and because they contain no tree dependencies from the nodes of slice 1202.

Additionally, various combinations of parallel decoding are possible because slices 1206 and 1208 don't depend on the immediately preceding slice. For example, once the entropy context for slice 1210 is added to the memory buffer, decoding of subsequent dependent slices, such as 1206 and 1208 may begin. Also, if the saved entropy context for a slice is not the last node in the slice, such as for flag 1108 illustrated in FIG. 11A, once the flagged node is reached and the entropy context for the flagged node is added to the memory buffer, subsequent slices may begin to be decoded using the saved entropy context/entropy re-set in parallel with decoding the rest of the reference slice.

In some embodiments, attribute information may be signaled independently of the geometry tree data.

Figure 13:
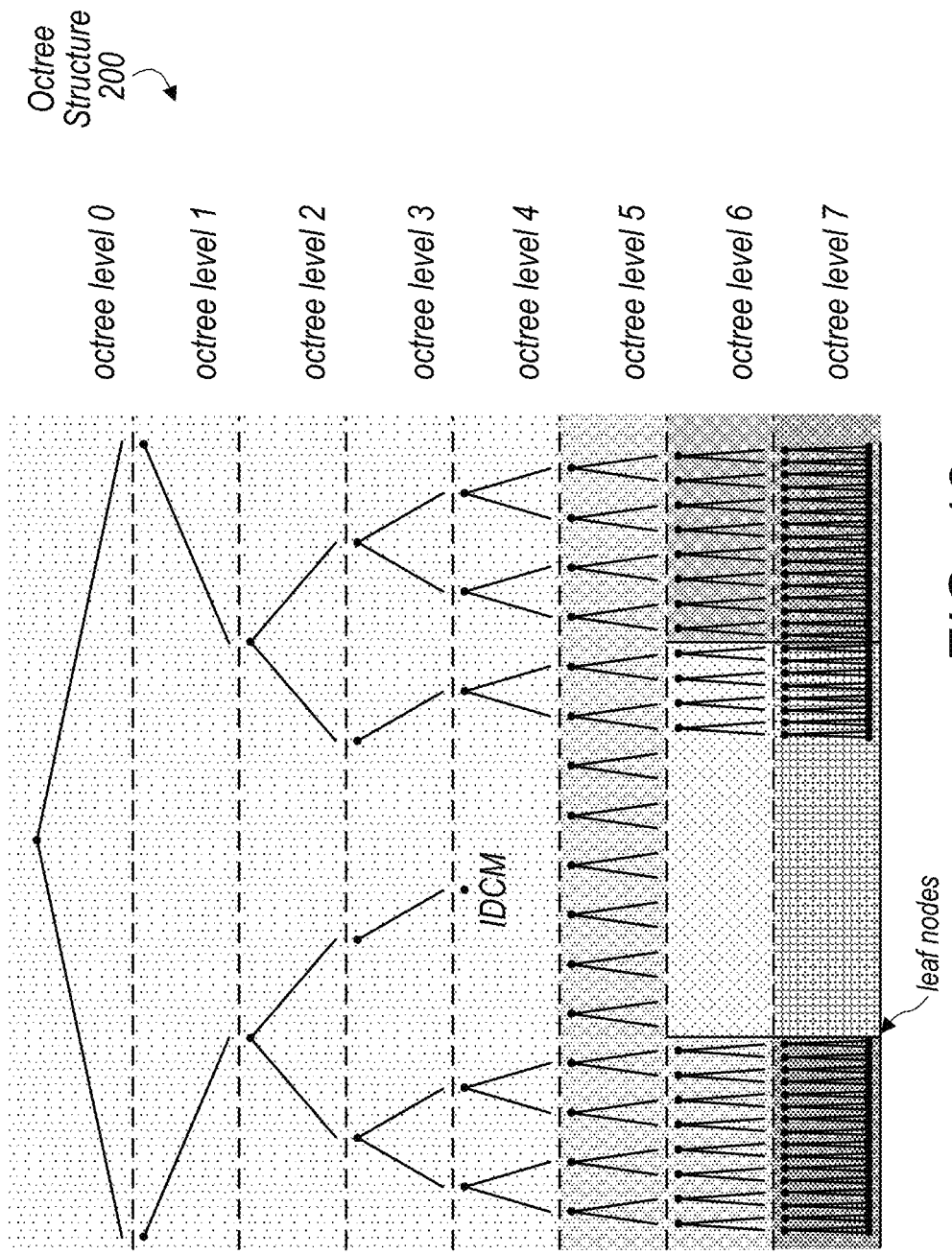
FIG. 13 illustrates, an example octree structure with an early termination of a sub-tree, according to some embodiments.

FIG. 13 illustrates, an example octree structure with an early termination of a sub-tree, according to some embodiments.

In some embodiments, each geometry slice may generate zero or more output points. For example, the leaf nodes shown in FIG. 13 may generate output points. Also the early terminated sub-tree (e.g. IDCM) may generate one or more output points.

In some embodiments, a single attribute slice is generated for each geometry slice with output points. In some embodiments, levels of detail or region adaptive hierarchical transforms are generated for, or applied to, only output points generated by a geometry slice with output points.

In some embodiments, attribute slices are generated for geometry slices that do not include output points, or are generated for points of geometry slices other than output points. These may be considered virtual points. For example, if a geometry slice were to be lost, and the output points were to be generated using a higher level geometry slice, an attribute slice may be generated for both of the geometry slices, wherein if the lower level geometry slice is not lost, the attribute slice for the higher level geometry slice is simply ignored at the decoder. However, if the lower level geometry slice is lost, the attribute slice for the higher level geometry slice (e.g. virtual output points) may be used to determine attributes for a lower resolution output that is generated when the lower level geometry slice is lost. A similar technique may be use for partial decoding.

Figure 15A:
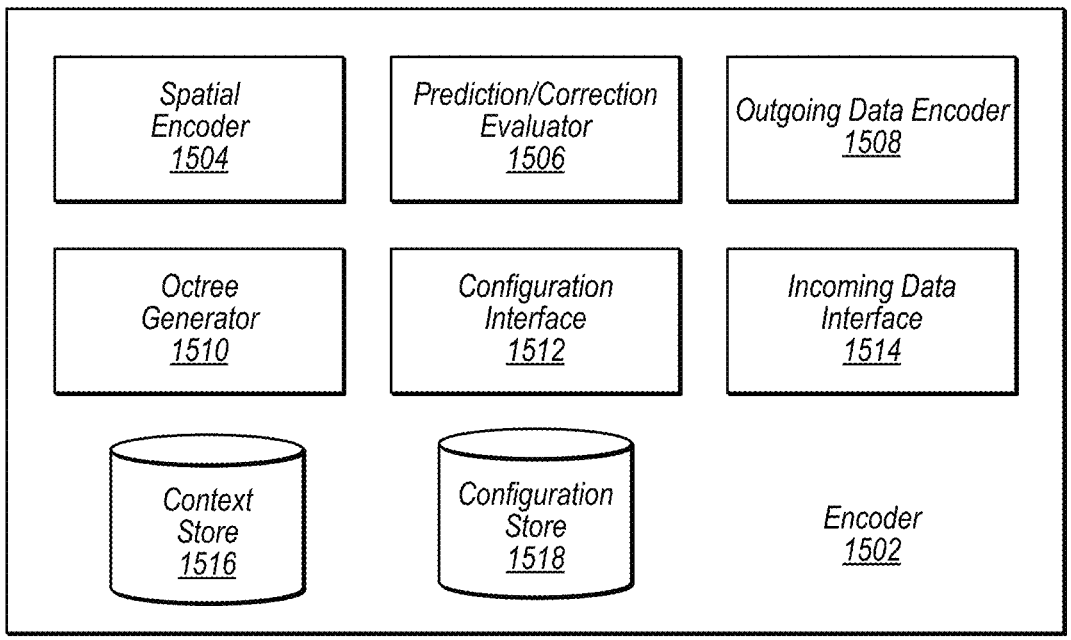
FIG. 15A illustrates components of an encoder, according to some embodiments.

FIG. 15A illustrates components of an encoder, according to some embodiments.

Encoder 1502 may be a similar encoder as encoder 104 illustrated in FIG. 1. Encoder 1502 includes spatial encoder 1504, octree tree generator 1510, prediction/correction evaluator 1506, incoming data interface 1514, and outgoing data interface 1508. Encoder 1502 also includes context store 1516 (e.g. a memory buffer) and configuration store 1518.

In some embodiments, a spatial encoder, such as spatial encoder 1504, may compress spatial information associated with points of a point cloud, such that the spatial information can be stored or transmitted in a compressed format. In some embodiments, a spatial encoder, such as spatial encoder 1504, may utilize octrees to compress spatial information for points of a point cloud as discussed in more detail above.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud.

An octree generator, such as octree generator 1510, may utilize spatial information for points of a point cloud to generate an octree that subdivides a point cloud into cubes and sub-cubes.

A prediction/correction evaluator, such as prediction/correction evaluator 1506 of encoder 1502, may determine predicted attribute values for points of a point cloud based on an inverse distance interpolation method using attribute values of the K-nearest neighboring points of a point for whom an attribute value is being predicted. The prediction/correction evaluator may also compare a predicted attribute value of a point being evaluated to an original attribute value of the point in a non-compressed point cloud to determine an attribute correction value. In some embodiments, a prediction/correction evaluator, such as prediction/correction evaluator 1506 of encoder, 1502 may adaptively adjust a prediction strategy used to predict attribute values of points in a given neighborhood of points based on a measurement of the variability of the attribute values of the points in the neighborhood.

An outgoing data encoder, such as outgoing data encoder 1508 of encoder 1502, may encode attribute correction values and assigned attribute values included in a compressed attribute information file for a point cloud.

In some embodiments, an encoder, such as encoder 1502, may also include an incoming data interface, such as incoming data interface 1514. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 1514 of encoder 1502.

In some embodiments, an encoder, such as encoder 1502, may further include a configuration interface, such as configuration interface 1512, wherein one or more parameters used by the encoder to compress a point cloud may be adjusted via the configuration interface. In some embodiments, a configuration interface, such as configuration interface 1512, may be a programmatic interface, such as an API. Configurations used by an encoder, such as encoder 1502, may be stored in a configuration store, such as configuration store 1518.

In some embodiments, an encoder, such as encoder 1502, may include more or fewer components than shown in FIG. 15A.

Figure 15B:
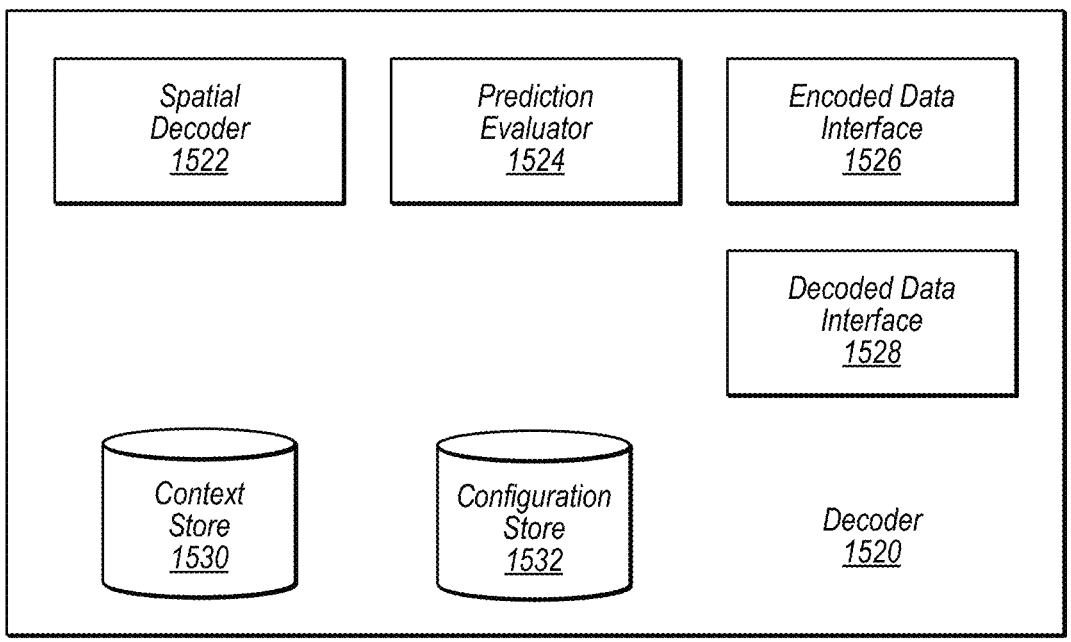
FIG. 15B illustrates components of a decoder, according to some embodiments.

FIG. 15B illustrates components of a decoder, according to some embodiments. Decoder 1520 may be a similar decoder as decoder 116 illustrated in FIG. 1. Decoder 1520 includes encoded data interface 1526, spatial decoder 1522, prediction evaluator 1524, context store 1530, configuration store 1532, and decoded data interface 1528.

A decoder, such as decoder 1520, may receive an encoded compressed point cloud and/or an encoded compressed attribute information file for points of a point cloud, such as an encoded bit stream as discussed above. For example, a decoder, such as decoder 1520, may receive a compressed attribute information file and/or a compressed spatial information file. The compressed attribute information file and/or compressed spatial information file may be received by a decoder via an encoded data interface, such as encoded data interface 1526. The encoded compressed point cloud may be used by the decoder to determine spatial information for points of the point cloud. For example, spatial information of points of a point cloud included in a compressed point cloud bit stream may be generated by a spatial decoder, such as spatial decoder 1522. In some embodiments, a compressed point cloud may be received via an encoded data interface, such as encoded data interface 1526, from a storage device or other intermediary source, wherein the compressed point cloud was previously encoded by an encoder, such as encoder 1502. In some embodiments, an encoded data interface, such as encoded data interface 1526, may decode spatial information. For example the spatial information may have been encoded using various encoding techniques as described herein.

An attribute prediction evaluator of a decoder, such as prediction evaluator 1524, may select a starting point of a minimum spanning tree based on an assigned starting point included in a compressed attribute information file. In some embodiments, the compressed attribute information file may include one or more assigned values for one or more corresponding attributes of the starting point. In some embodiments, an attribute prediction evaluator, such as prediction evaluator 1524, may assign values to one or more attributes of a starting point in a decompressed model of a point cloud being decompressed based on assigned values for the starting point included in a compressed attribute information file. A prediction evaluator, such as prediction evaluator 1524, may further utilize the assigned values of the attributes of the starting point to determine attribute values of neighboring points. For example, a prediction evaluator may select a next nearest neighboring point to the starting point as a next point to evaluate, wherein the next nearest neighboring point is selected based on a shortest distance to a neighboring point from the starting point in the minimum spanning tree. Note that because the minimum spanning tree is generated based on the same or similar spatial information at the decoder as was used to generate a minimum spanning tree at an encoder, the decoder may determine the same evaluation order for evaluating the points of the point cloud being decompressed as was determined at the encoder by identifying next nearest neighbors in the minimum spanning tree.

A decoder, such as decoder 1520, may provide a decompressed point cloud generated based on a received compressed point cloud and/or a received compressed attribute information file to a receiving device or application via a decoded data interface, such as decoded data interface 1528. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Exampled Applications for Point Cloud Compression and Decompression

Figure 16:
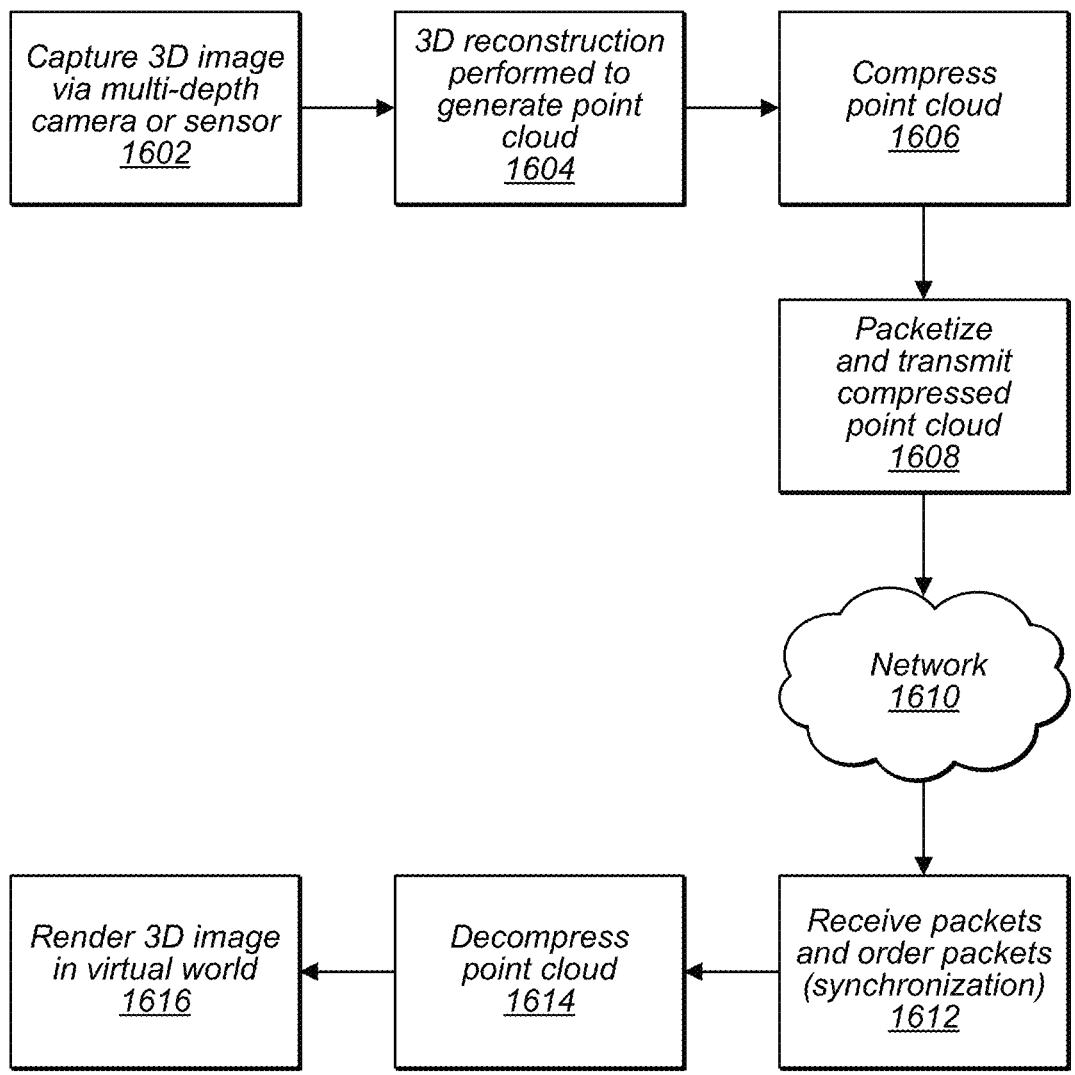
FIG. 16 illustrates compressed point cloud information being used in a 3-D telepresence application, according to some embodiments.

FIG. 16 illustrates compressed point clouds being used in a 3-D telepresence application, according to some embodiments.

In some embodiments, a sensor, such as sensor 102, an encoder, such as encoder 104 or encoder 1502, and a decoder, such as decoder 116 or decoder 1520, may be used to communicate point clouds in a 3-D application. For example, a sensor, such as sensor 102, at 1602 may capture a 3D image and at 1604, the sensor or a processor associated with the sensor may perform a 3D reconstruction based on sensed data to generate a point cloud.

At 1606, an encoder such as encoder 104 or 1502 may compress the point cloud and at 1608 the encoder or a post processor may packetize and transmit the compressed point cloud, via a network 1610. At 1612, the packets may be received at a destination location that includes a decoder, such as decoder 116 or decoder 1520. The decoder may decompress the point cloud at 1614 and the decompressed point cloud may be rendered at 1616. In some embodiments a 3-D telepresence application may transmit point cloud data in real time such that a display at 1616 represents images being observed at 1602. For example, a camera in a canyon may allow a remote user to experience walking through a virtual canyon at 1616.

Figure 17:
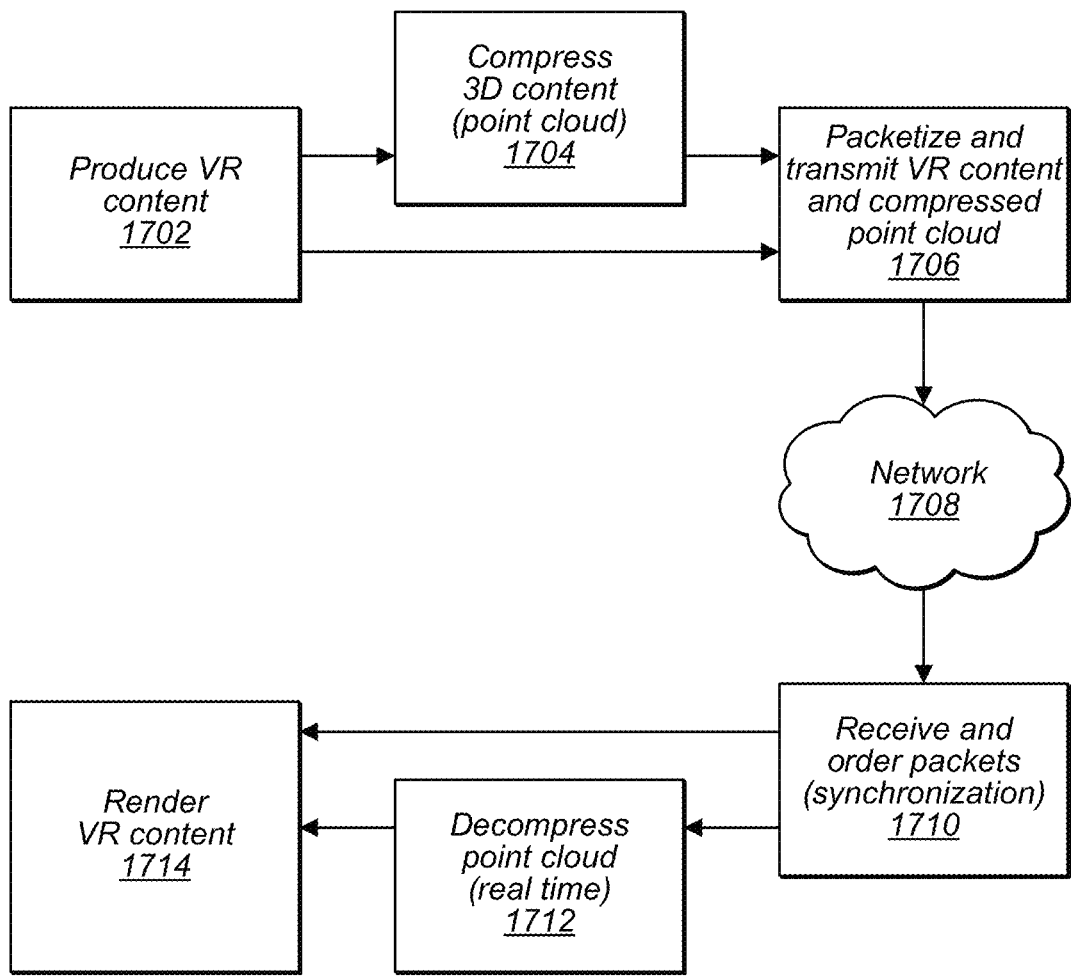
FIG. 17 illustrates compressed point cloud information being used in a virtual reality application, according to some embodiments.

FIG. 17 illustrates compressed point clouds being used in a virtual reality (VR) or augmented reality (AR) application, according to some embodiments.

In some embodiments, point clouds may be generated in software (for example as opposed to being captured by a sensor). For example, at 1702 virtual reality or augmented reality content is produced. The virtual reality or augmented reality content may include point cloud data and non-point cloud data. For example, a non-point cloud character may traverse a landscape represented by point clouds, as one example. At 1704, the point cloud data may be compressed and at 1706 the compressed point cloud data and non-point cloud data may be packetized and transmitted via a network 1708. For example, the virtual reality or augmented reality content produced at 1702 may be produced at a remote server and communicated to a VR or AR content consumer via network 1708. At 1710, the packets may be received and synchronized at the VR or AR consumer's device. A decoder operating at the VR or AR consumer's device may decompress the compressed point cloud at 1712 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Some embodiments, of the present disclosure may further be described in view of the following clauses:

1. A non-transitory computer-readable medium storing program instructions that, when executed by one or more processors, cause the one or more processors to:
   receive a bit stream comprising:
      a plurality of node groups of nodes of an octree structure for a point cloud, wherein the nodes of the octree structure define spatial locations of points of the point cloud, and wherein each node group comprises a sub-set of a set of the nodes of the octree structure for the point cloud; and
   reconstruct a geometry of the point cloud based on the nodes included in the respective node groups of the bit stream, wherein to reconstruct the geometry the program instructions cause the one or more processors to:
      scan the nodes within a given node group according to a breadth first scan order; and
      select a next subsequent node group to evaluate according to a depth first scan order.

2. The non-transitory computer-readable medium of clause 1, wherein the program instructions, when executed by the one or more processors, cause the one or more processors to:
   select the next subsequent node group to evaluate according to the depth first scan based on a flag in the given node group indicating to select the next subsequent node group to evaluate according to the depth first scan order.

3. The non-transitory computer-readable medium of clause 2, wherein to reconstruct the geometry of the point cloud, the program instructions, cause the one or more processors to:
   select a following subsequent node group to evaluate, that follows the next subsequent node group, according to a breadth first scan order, wherein the next subsequent node group does not include a flag indicating to select the following subsequent node group according to the depth first scan order.

4. The non-transitory computer-readable medium of clause 1, wherein to scan the nodes within a given node group according to the breadth first scan order, the program instructions, cause the one or more processors to:

scan sequential nodes in the node group at a same level of the octree structure, and if an end of the nodes in the same level of the octree structure is reached before an end of the node group is reached, proceed to scan sequential nodes in the node group for a next lower level of the octree structure.

5. The non-transitory computer-readable medium of clause 1, wherein to select the next subsequent node group to evaluate according to the depth first scan order, the program instructions, cause the one or more processors to:

select a next node group that comprises child nodes at a lower level of the octree structure than parent nodes included in a current node group being evaluated, wherein if the octree structure does not include child nodes at a lower level of the octree structure for the nodes included in the current node group being evaluated, the depth first scan order reverts to a node group comprising parent nodes of the nodes of the current node group being evaluated, wherein the parent nodes are at a higher level of the octree structure than the nodes of the current node group being evaluated and then the depth first scan order proceeds back down to a node group comprising sibling nodes of the nodes of the current node group being evaluated at a same level of the octree structure, if the node group comprising the parent nodes has already been evaluated.

6. The non-transitory computer-readable medium of clause 1, wherein each of the plurality of node groups represents a spatial volume comprising a plurality of octet cubes of the octree structure at a given octree level of the octree structure.

7. The non-transitory computer-readable medium of clause 6, wherein the bit stream further comprises:

a slice header for a slice comprising a sub-set of the node groups, and wherein the slice header indicates a node group size for the sub-set of the node groups included in the slice.

8. The non-transitory computer-readable medium of clause 1, wherein occupancy information for the nodes of the octree structure included in the plurality of node groups have been encoded using an entropy encoder, and wherein the program instructions, when executed by the one or more processors, cause the one or more processors to:

determine an encoding context for decoding the occupancy information for respective ones of the nodes, based on occupancy information for neighboring nodes of a given node for which the entropy encoded occupancy information is being decoded, wherein the neighboring nodes considered for determining the encoding context for a given node are limited to other nodes included in a same node group as the given node.

9. A non-transitory computer-readable medium storing program instructions that, when executed by one or more processors, cause the one or more processors to:

receive a point cloud to be compressed, wherein the point cloud comprises a plurality of points in three-dimensional space;

generate an octree structure that comprises occupancy information for nodes of the octree structure, wherein the occupancy information indicates whether cubes or sub-cubes at a given level of the octree structure are occupied or non-occupied by one or more points of the point cloud;

group the nodes of the octree into a plurality of node groups, wherein each node group comprises a sub-set of the nodes of the octree structure; and generate a bit stream comprising:
  encoded occupancy information for nodes of the octree included in the node groups, wherein the nodes within a given node group are organized according to a breadth first scan order; and
  wherein occupancy information for nodes of a subsequent node group to be evaluated are selected according to a depth first scan order between node groups.

10. The non-transitory computer-readable medium of clause 9, wherein the program instructions, when executed by the one or more processors, cause the one or more processors to:

include a flag in the bit stream indicating the subsequent node group is to be selected for evaluation according to the depth first scan order, wherein otherwise the subsequent node group is selected for evaluation according to a breadth first scan order.

11. The non-transitory computer-readable medium of clause 9, wherein the program instructions, when executed by the one or more processors, cause the one or more processors to:

select each subsequent node group to be evaluated according to the depth first scanning order for selecting subsequent node groups to be evaluated, wherein nodes within a given node group are entropy decoded according to the breadth first scanning order.

12. The non-transitory computer-readable medium of clause 9, wherein the program instructions, when executed by the one or more processors, cause the one or more processors to:

select a set of node groups based on a depth first scanning order or a breadth first scanning order such that the set of node groups comprise a quantity of nodes that corresponds to a size of a slice used to transmit a portion of the bit stream.

13. The non-transitory computer-readable medium of clause 9, wherein the program instructions, when executed by the one or more processors, cause the one or more processors to:

signal in the bit stream for a given slice, a flag indicating a last node group of the slice, wherein a slice comprises a plurality of node groups and a header comprising information for the node groups of the given slice.

14. The non-transitory computer-readable medium of clause 13, wherein the program instructions, when executed by the one or more processors, cause the one or more processors to:

signal in the slice header for the given slice, a node group size for node groups included in the given slice.

15. A device comprising:
a memory storing program instructions; and
one or more processors, wherein the program instructions, when executed by the one or more processors, cause the one or more processors to:
  receive a bit stream comprising:
    a plurality of node groups of nodes of an octree structure for a point cloud, wherein the nodes of the octree structure define spatial locations of points of the point cloud, and wherein each node group comprises a sub-set of a set of the nodes of the octree structure for the point cloud; and
reconstruct a geometry of the point cloud based on the nodes included in the respective node groups of the bit stream, wherein to reconstruct the geometry the program instructions cause the one or more processors to:
scan the nodes within a given node group according to a breadth first scan order; and
select a next subsequent node group to evaluate according to a depth first scan order.

16. The device of clause 15, further comprising:
a display,
wherein the program instructions, when executed by the one or more processors, cause the one or more processors to:
render the point cloud having the reconstructed geometry on the display of the device.

17. The device of clause 15, wherein the program instructions, when executed by the one or more processors cause the one or more processors to:
select the next subsequent node group to evaluate according to the depth first scan based on a flag in a preceding evaluated node group indicating to select the next subsequent node group to evaluate according to the depth first scan order.

18. The device of clause 15, wherein the program instructions, when executed by the one or more processors cause the one or more processors to:
select a following subsequent node group to scan, that follows the next subsequent node group, according to a breadth first scan order, wherein the next subsequent node group does not include a flag indicating to select the following subsequent node group according to the depth first scan order.

19. A device comprising:
a memory storing program instructions; and one or more processors, wherein the program instructions, when executed by the one or more processors, cause the one or more processors to:
receive a point cloud to be compressed, wherein the point cloud comprises a plurality of points in three-dimensional space;
generate an octree structure that comprises occupancy information for nodes of the octree, wherein the occupancy information indicates whether cubes or sub-cubes at a given level of the octree structure are occupied or non-occupied by one or more points of the point cloud;
group the nodes of the octree into a plurality of nodes groups, wherein each node group comprises a sub-set of the nodes of the octree structure; and
generate a bit stream comprising:
encoded occupancy information for nodes of the octree included in the node groups, wherein the nodes within a given node group are organized according to a breadth first scan order; and
wherein occupancy information for nodes of a subsequent node group to be included in the bit stream are selected according to a depth first scan order between node groups.

20. The device of clause 19, further comprising:
one or more sensors configured to capture a plurality of points that make up the point cloud, wherein respective ones of the points comprise spatial information for the point and attribute information for the point,
wherein the point cloud to be compressed is received from the one or more sensors.

21. The device of clause 19, wherein the program instructions, when executed by the one or more processors, cause the one or more processors to:
include a flag in the bit stream indicating the subsequent node group is to be selected to be evaluated according to the depth first scan order, wherein otherwise the subsequent node group is selected to be evaluated according to a breadth first scan order.

22. A non-transitory computer-readable medium storing program instructions that, when executed by one or more processors, cause the one or more processors to:
receive a point cloud to be compressed, wherein the point cloud comprises a plurality of points in three-dimensional space;
generate an octree structure that comprises occupancy information for nodes of the octree, wherein the occupancy information indicates whether at a given level of the octree structure, cubes or sub-cubes of the octree at the given level are occupied or non-occupied by one or more points of the point cloud; and
organize the nodes of the octree structure into a plurality of slices comprising:
a first slice of the octree structure comprising a sub-set of a set of nodes of the octree structure; and
two or more additional slices of the octree structure, wherein the two or more additional slices each comprise additional respective sub-sets of the set of nodes of the octree structure;
encode occupancy information for the nodes of the octree included in the first slice and the two or more additional slices; and
generate a bit stream comprising:
the encoded occupancy information for the nodes included in the first slice and a flag indicating an end of the first slice;
the encoded occupancy information for the nodes included in the two or more additional slices and additional respective flags indicating respective ends of the two or more additional slices; and
for at least the two or more additional slices:
an indication of a position in the octree structure for at least one of the nodes of the respective slice, wherein the indicated position is indicated using:
a reference to a particular tree level of the octree structure and a spatial position within the tree level; or
a reference to a particular tree level of the octree structure and a node index position within the tree level.

23. The non-transitory computer-readable medium of clause 22, wherein the generated bit stream further comprises:
respective index values indicating respective orders of the respective plurality of slices relative to other ones of the plurality of slices.

24. The non-transitory computer-readable medium of clause 22, wherein the generated bit stream further comprises:
respective headers for the plurality of slices, wherein the headers indicate volumetric sizes of node groups included in the respective slices.

23. The non-transitory computer-readable medium of clause 22, wherein the slice and the two or more additional slices each correspond in size to a size of a data transmission unit for transmitting the bit stream over a network to a decoder.

24. The non-transitory computer-readable medium of clause 22, wherein the occupancy information for the nodes is encoded using an entropy encoder, and wherein the program instructions, when executed by the one or more processors, further cause the one or more processors to:

determine an encoding context for encoding the occupancy information for respective ones of the nodes of the plurality of slices, based on occupancy information for neighboring nodes of a given node for which the entropy encoded occupancy information is being encoded; and include in the bit stream for each of the plurality of slices an indication for an initial entropy context to be used for decoding the entropy encoded occupancy information for a given node of the respective slice.

25. The non-transitory computer-readable medium of clause 24, wherein the indication for the initial entropy context to be used for decoding the entropy encoded occupancy information for the given node of the respective slice indicates:

an entropy context saved to a memory buffer for a preceding slice is to be used as the initial entropy context for the given slice; or a re-set entropy context is to be used as the initial entropy context for the given slice.

26. The non-transitory computer-readable medium of clause 25, wherein respective indications for two or more slices indicate:

a same saved entropy context for a preceding slice is to be used as the initial entropy context for the two or more slices.

27. The non-transitory computer-readable medium of clause 25, wherein the program instructions, when executed by the one or more processors, further cause the one or more processors to:

include respective flags in the bit-stream for respective ones of the nodes of the plurality of slices, wherein the respective flags indicate that an entropy context used to decode the entropy encoded occupancy information for the respective ones of the nodes are to be added to the memory buffer that stores saved entropy contexts for use as initial entropy contexts for subsequent slices.

28. The non-transitory computer-readable medium of clause 25, wherein the program instructions, when executed by the one or more processors, further cause the one or more processors to:

indicate in the bit stream a last node in a tree level of the octree structure with a flag, wherein the flag indicates that an entropy context used to decode the last node in the tree level is to be added to the memory buffer.

Example Computer System

Figure 18:
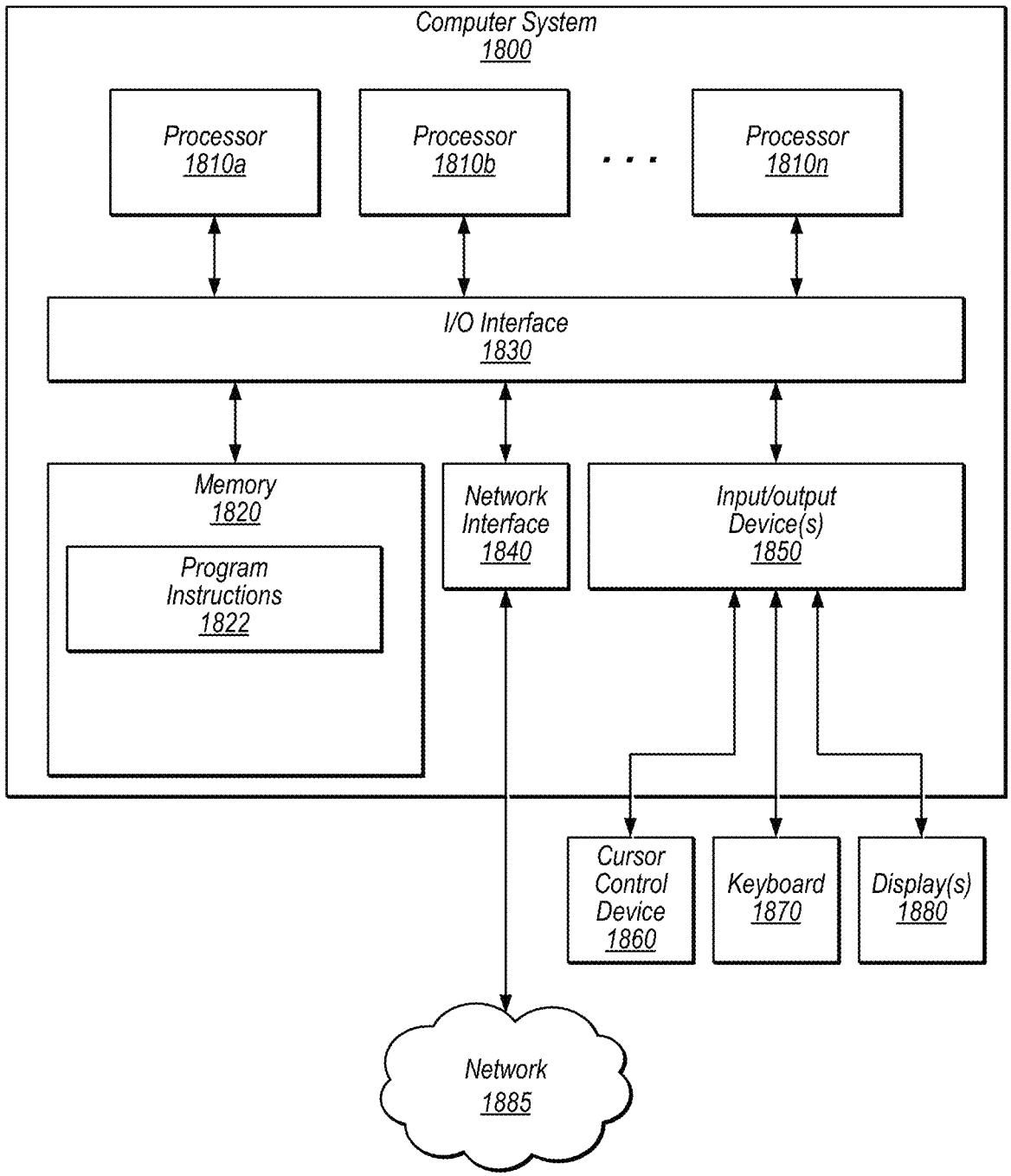
FIG. 18 illustrates an example computer system that may implement an encoder or decoder, according to some embodiments.

FIG. 18 illustrates exemplary computer system 1800 usable to implement an encoder or decoder as described herein, (e.g., as described above with reference to FIGS. 1-17), in accordance with some embodiments. In different embodiments, computer system 1800 may be any of various types of devices, including, but not limited to, a personal computer system, desktop computer, laptop, notebook, tablet, slate, pad, netbook computer, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880.

System memory 1820 may be configured to store point cloud compression or point cloud decompression program instructions 1822 and/or sensor data accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions 1822 may be configured to implement an image sensor control application incorporating any of the functionality described above. In some embodiments, program instructions and/or data may be received, sent or stored upon different types of computer-accessible media or on similar media separate from system memory 1820 or computer system 1800.

In one embodiment, I/O interface 1830 may be configured to coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network 1885 (e.g., carrier or agent devices) or between nodes of computer system 1800. Network 1885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or accessing data by one or more computer systems 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1822, which may be processor-executable to implement any element or action described above. In one embodiment, the program instructions may implement the methods described above. In other embodiments, different elements and data may be included.

Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A non-transitory computer-readable medium storing program instructions that, when executed by one or more processors, cause the one or more processors to:
   receive a bit stream comprising:
      a slice of an octree structure for a point cloud, wherein the octree structure for the point cloud comprises a set of nodes that define spatial locations of points of the point cloud, and wherein the slice comprises a sub-set of the set of nodes of the octree structure and a flag indicating an end of the slice;
      two or more additional slices of the octree structure for the point cloud, wherein the two or more additional slices each comprise additional respective sub-sets of the set of nodes of the octree structure and additional respective flags indicating respective ends of the two or more additional slices; and
      wherein at least the two or more additional slices comprise:
         an indication of a position in the octree structure for at least one of the nodes of the respective slice, wherein the indicated position is indicated using:
            a reference to a particular tree level of the octree structure and a spatial position within the tree level; or
            a reference to a particular tree level of the octree structure and a node index position within the tree level, wherein the node index position for the respective slice is indicated without a dependency on a preceding slice; and
   reconstruct a geometry of the point cloud based on the bit stream, wherein to reconstruct the geometry the respective sub-sets of nodes of the two or more additional slices are located in the octree structure based on their respective indicated positions.

2. The non-transitory computer-readable medium of claim 1, wherein the two or more additional slices further comprise:
   an index value indicating an order of the respective slices relative to other ones of the slices of the octree structure.

3. The non-transitory computer-readable medium of claim 2, wherein the program instructions, when executed by the one or more processors, cause the one or more processors to:
   determine that a given slice in the order is missing; and
   position a next, non-missing one of the two or more slices, in a position in the octree structure based on the position indication included in the bit stream for the next, non-missing on the slices,
   wherein the program instructions, when executed by the one or more processors, cause the one or more processors to:
   reconstruct the geometry of the point cloud at a different resolution for a portion of the point cloud corresponding to the given missing slice.

4. The non-transitory computer-readable medium of claim 1, wherein the program instructions, when executed by the one or more processors, cause the one or more processors to:

receive an instruction to reconstruct a scaled resolution version of the point cloud; and reconstruct the point cloud using less than a full set of slices of the octree structure for the point cloud;

wherein a geometry of the point cloud corresponding to nodes included in slices of the octree structure that are not used in the reconstruction are reconstructed at a different resolution than if the nodes of the not-used slices were to be used in the reconstruction of the point cloud.

5. The non-transitory computer-readable medium of claim 1, wherein the slice and the two or more additional slices each correspond in size to a size of a data transmission unit for transmitting a portion of the bit stream over a network to a decoder.

6. The non-transitory computer-readable medium of claim 5, wherein:

the data transmission unit for transmitting the bit stream over the network is an internet protocol (IP) packet;

the slice and the two or more additional slices are determined at an application layer separate from an IP layer, such that the slice and the two or more additional slices each have a size that fits within a payload of an IP packet; and in response to a lost IP packet comprising one of the slices of the octree structure for the point cloud, the program instructions, when executed on the one or more processors cause the one or more processor to proceed to reconstruct the point cloud without requiring a re-transmission of the lost IP packet.

7. The non-transitory computer-readable medium of claim 1, wherein occupancy information for the nodes of the octree structure included in the slice and the two or more additional slices have been encoded using an entropy encoder, and wherein the program instructions, when executed by the one or more processors, cause the one or more processors to:

determine an encoding context for decoding the entropy encoded occupancy information for respective ones of the nodes, based on occupancy information for neighboring nodes of a given node for which the entropy encoded occupancy information is being decoded, wherein the at least two or more additional slices comprise:

a header indicating that an entropy context to be used to entropy decode entropy encoded occupancy information for a given node of a given one of the two or more additional slices is:

to be re-set to a default entropy context; or to be set to an entropy context saved for a preceding slice, wherein the program instructions cause the one or more processors to:

save an entropy context determined for a given one of the slice or the two or more additional slices to a memory buffer to be used as the saved entropy context for a subsequent one of the two or more additional slices.

8. The non-transitory computer-readable medium of claim 7, wherein at least two of the two or more additional slices reference a same entropy context saved to the memory buffer for a preceding slice.

9. The non-transitory computer-readable medium of claim 8, wherein the program instructions, when executed by the one or more processors, cause:

the entropy encoded occupancy information for at least two of the two or more slices referencing the same entropy context for the preceding slice to be entropy decoded at least partially in parallel.

10. The non-transitory computer-readable medium of claim 8, wherein the program instructions, when executed by the one or more processors, cause:

the entropy encoded occupancy information for a given one of the two or more slices referencing the same entropy context for the preceding slice to be entropy decoded regardless as to whether another one of the two or more slices referencing the same entropy context is a missing slice.

11. The non-transitory computer-readable medium of claim 7, wherein the program instructions, when executed by the one or more processors, cause:

an entropy context to be saved to the memory buffer for at least one node of each slice for which entropy encoded occupancy information is decoded.

12. The non-transitory computer-readable medium of claim 11, wherein the entropy context is saved for a last node of a given slice for which encoded occupancy information is decoded.

13. The non-transitory computer-readable medium of claim 11, wherein the entropy context is saved for a given slice of the two or more additional slices, wherein the given slice spans more than one tree level of the octree structure, and wherein for the given slice an entropy encoding context for a node in a penultimate tree level is stored to the memory buffer.

14. The non-transitory computer-readable medium of claim 7, wherein the program instructions, when executed by the one or more processors, cause:

an entropy context to be saved to the memory buffer for a last node of each tree level of the octree structure for which entropy encoded occupancy information is decoded.

15. The non-transitory computer-readable medium of claim 14, wherein the program instructions, when executed by the one or more processors, cause:

the entropy context saved to the memory buffer for the last node of a given tree level to overwrite a previous entropy context saved to the memory buffer for a given slice spanning more than one tree level.

16. The non-transitory computer-readable medium of claim 14, wherein a last node of a given tree level is marked with a flag in the bit stream, wherein the flag indicates that an entropy context for the flagged node is to be saved to the memory buffer.

17. The non-transitory computer-readable medium of claim 7, wherein a header for a given slice for which the entropy encoded occupancy information is being decoded identifies a preceding slice from which the entropy context is to be restored.

18. The non-transitory computer-readable medium of claim 7, wherein a preceding slice from which an entropy context is to be restored is implicitly determined based on an encoding rule applied at both an encoder and a decoder.

19. The non-transitory computer-readable medium of claim 1, wherein each of the two or more additional slices comprises two or more node groups, wherein the node groups represent a spatial volume of the octree structure, and wherein a header for each of the respective two or more additional slices indicates a node group size for node groups included in the respective slice.

20. A device, comprising:

a memory storing program instructions; and one or more processors, wherein the program instructions, when executed using the one or more processors,
cause the one or more processors to:
receive a bit stream comprising:
- a slice of an octree structure for a point cloud, wherein the octree structure for the point cloud comprises a set of nodes that define spatial locations of points of the point cloud, and wherein the slice comprises a sub-set of the set of nodes of the octree structure and a flag indicating an end of the slice;
- two or more additional slices of the octree structure for the point cloud, wherein the two or more additional slices each comprise additional respective sub-sets of the set of nodes of the octree structure and additional respective flags indicating respective ends of the two or more additional slices; and
- wherein at least the two or more additional slices comprise:
  - an indication of a position in the octree structure for at least one of the nodes of the respective slice, wherein the indicated position is indicated using:
    - a reference to a particular tree level of the octree structure and a spatial position within the tree level; or
    - a reference to a particular tree level of the octree structure and a node index position within the tree level, wherein the node index position for the respective slice is indicated without a dependency on a preceding slice; and
reconstruct a geometry of the point cloud based on the bit stream, wherein to reconstruct the geometry the respective sub-sets of nodes of the two or more additional slices are located in the octree structure based on their respective indicated positions.

* * * * *